(12) United States Patent
Peterson et al.

(10) Patent No.: US 8,583,625 B2
(45) Date of Patent: Nov. 12, 2013

(54) SYSTEMS AND METHODS FOR NETWORK ACCELERATION AND EFFICIENT INDEXING FOR CACHING FILE SYSTEMS

(75) Inventors: Larry L. Peterson, Princeton, NJ (US); Vivek S. Pai, Princeton, NJ (US); Sunghwan Ihm, Sunnyvale, CA (US); Anirudh Badam, Princeton, NJ (US); KyoungSoo Park, Daejeon (KR)

(73) Assignee: The Trustees of Princeton, University, NJ (US)

( * ) Notice: Subject to any disclaimer, the term of this patent is extended or adjusted under 35 U.S.C. 154(b) by 163 days.

(21) Appl. No.: 13/257,736

(22) PCT Filed: Mar. 20, 2010

(86) PCT No.: PCT/US2010/028072
§ 371 (c)(1),
(2), (4) Date: Dec. 2, 2011

(87) PCT Pub. No.: WO2010/108165
PCT Pub. Date: Sep. 23, 2010

(65) Prior Publication Data
US 2012/0102009 A1    Apr. 26, 2012

Related U.S. Application Data

(60) Provisional application No. 61/167,887, filed on Mar. 20, 2009, provisional application No. 61/211,203, filed on Mar. 26, 2009.

(51) Int. Cl.
*G06F 17/30* (2006.01)
(52) U.S. Cl.
USPC ................ 707/713; 707/791; 707/796

(58) Field of Classification Search
USPC .......................... 707/713, 791, 796
See application file for complete search history.

(56) References Cited

U.S. PATENT DOCUMENTS

| 6,292,880 | B1 | 9/2001 | Mattis | |
|---|---|---|---|---|
| 7,116,249 | B2 | 10/2006 | McCanne | |
| 8,386,494 | B2* | 2/2013 | Vachuska | 707/741 |
| 8,464,021 | B2* | 6/2013 | Allen et al. | 711/202 |
| 2004/0255048 | A1 | 12/2004 | Kiki | |
| 2007/0143274 | A1* | 6/2007 | Uppala | 707/4 |
| 2008/0288713 | A1 | 11/2008 | Kang | |
| 2011/0145188 | A1* | 6/2011 | Vachuska | 707/610 |
| 2013/0013573 | A1* | 1/2013 | Anglin | 707/692 |

OTHER PUBLICATIONS

Pucha, et al. Exploiting Similarity for Multi-Source Downloads Using File Handprints. 10 Proceedings of the 4th Symposium on Networked System Design and Implementation, Cambridge, MA, Apr. 2007.

(Continued)

*Primary Examiner* — Thanh-Ha Dang
(74) *Attorney, Agent, or Firm* — Meagher Emanuel Laks Goldberg & Liao, LLP

(57) ABSTRACT

The illustrative embodiments described herein are directed to a system, methods, and computer program product, for network acceleration and efficient indexing for caching file systems. For example, the disclosed embodiments achieve (1) high compression rate, (2) low disk seeks, and (3) low memory pressure using by introducing novel features such as, but not limited to, multi-resolution chunking and intelligent load shedding. In addition, the disclosed embodiments introduces a family of HashCache policies that enable large size web caching with little or no use of main memory.

15 Claims, 13 Drawing Sheets

(56) References Cited

OTHER PUBLICATIONS

D. d. Thaler and C. V. Ravishankar. "Using name-based mappings to increase hit rates." IEEE/ACM Transactions on Networking, 6(1):1-14, Feb. 1998.

M. 0. Rabin. "Fingerprinting by random polynomials." Technical Report TR-15-81, Harvard University, 1981.

A. Anand, A. Gupta, A. Akella, S. Seshan, and S. Shenker. "Packet caches on routers: The implications of universal redundant traffic elimination." In SIGCOMM, Aug. 2008.

N. T. Spring and D. Wetherall. "A protocol-independent technique for eliminating redundant network traffic." In ACM SIGCOMM, 2000.

A. Wolman, G. M. Voelker, N. Sharma, N. Cardwell, A. R. Karlin, and H. M. Levy. "On the scale and performance of cooperative web proxy caching." In Symposium on Operating Systems Principles, Dec. 1999.

L.Fan, et al. "Summary Cache:A Scalable Wide-Area Web Cache Sharing Protocol." IEEE/ACM Transactions on Networking, vol. 8, No. 3, Jun. 2000.

D. Teodosiu et al. "Optimizing File Replication over Limited-Bandwidth Networks using Remote Differential Compression" Microsoft Research, Nov. 2006.

R. Chakravorty, A. Clark, and I. Pratt. "Optimizing web delivery over wireless links: Design, implementation and experiences." In IEEE Journal of Selected Areas in Communications (JSAC), Feb. 2005.

F. Dogar, A. Phanishayee, H. Pucha, 0. Ruwase, and D. Andersen. "Ditto—A System for Opportunistic Caching in Multi-hop Wireless Mesh Networks." In MobiCom, Sep. 2008.

Riverbed Technologies "The Riverbed Optimization System (RiOS) 5.5": A Technical Overview, 2008.

S. Ha, I. Rhee, and L. Xu. "Cubic: a new tcp-friendly high-speed tcp variant." SJGOPS Operating Systems Review., 42 (5):64-74, 2008.

K. Park, S. Ihm, M. Bowman, and V. S. Pai. "Supporting practical content-addressable caching with czip compression." In USENIX ATC, 2007.

H. Pucha, M. Kaminsky, D. G. Andersen, and M.A. Kozuch. "Adaptive file transfers for diverse environments." In USENIX ATC, Jun. 2008.

H. Pucha, D. G. Andersen, and M. Kaminsky. "Exploiting similarity for multi-source downloads using file handprints." in USENJX NSDI, Cambridge, MA, Apr. 2007.

A. Chankhunthod, P. B. Danzig, C. Neerdaels, M. F. Schwartz, and K. J. Worrell. "A hierarchical internet object cache." in USENIX ATC, pp. 153-163, 1996.

A. Badam, K. Park, V. Pai, L. Peterson. "HashCache: Cache Storage for the Next Billion." Proceeding NSDI'09 Proceedings of the 6th USENIX symposium on Networked systems design and implementation pp. 123-136. 2009.

A. Muthitacharoen, B. Chen, and D. Mazieres. "A low-bandwidth network file system." In SOSP, 2001.

C. Maltzahn, K. J. Richardson, and D. Grunwald. "Performance issues of enterprise level web proxies." In In Proceedings of the SIC METRICS Conference on Measurement and Modeling of Computer Systems, pp. 13-23, Jun. 1997.

J. C. Mogul, Y. M. Chan, and T. Kelly. "Design, implementation, and evaluation of duplicate transfer detection in HTTP." In USENIX NSDI, Mar. 2004.

B. White, J. Lepreau, L. Stoller, R. Ricci, S. Guruprasad, M. Newbold, M. Hibler, C. Barb, and A. Joglekar. "An integrated experimental environment for distributed systems and networks." In OSDI, Oct. 2002.

N. Tolia, M. Kaminsky, D. G. Andersen, and S. Patil. "An architecture for Internet data transfer." In USENIX NSDI, May 2006.

R. Patra, S. Nedevschi, S. Surana, A. Sheth, L. Subramanian, and E. Brewer. "Wildnet: Design and implementation of high performance wifi based long distance networks." In USENIX NSDI, 2007.

V. N. Padmanabhan and J. C. Mogul. "Improving http.latency." Computer Networks and ISDN Systems, 28(1-2):25-35, Dec. 1995.

U. Saif, A. L. Chudhary, S. Butt, and N. F. Butt. "Poor man's broadband: peer-to-peer dialup networking." SIGCOMM Computer Communication Review., 37(5):5-16, Oct. 2007.

J. Mogul, B. Krishnamurthy, F. Douglis, A. Feldmann, Y. Goland, A. van Hoff, and D. Hellerstein. "Delta encoding in HTTP." RFC 3229, Jan. 2002.

S. Floyd. "Highspeed tcp for large congestion windows." RFC 3649, Dec. 2003.

M. Afanasyev, D. G. Andersen, and A. C. Snoeren. "Efficiency through eavesdropping: Link-layer packet caching." In USENIX NSDI. Apr. 2008.

S. Annapureddy, M. J. Freedman, and D. Mazieres. "Shark: Scaling file servers via cooperative caching." In USENIX NSDI, 2005.

K. Tangwongsan, H. Pucha, D. Andersen, M. Kaminsky. "Efficient Similarity Estimation for Systems Exploiting Data Redundancy." INFOCOM Proceedings IEEE. 2010.

U. Manber. "Finding similar files in a large file system." In Proceedings of the US EN! X Winter 1994 Technical Conference, Oct. 1993.

B. Du, M. Demmer, and E. Brewer. "Analysis of WWW traffic in Cambodia and Ghana." In WWW, May 2006.

S. Rhea, K. Liang, and E. Brewer. "Value-based web caching." In Proceedings of the Twelfth International World Wide Web Conference, May 2003.

The Riverbed Optimization System (RiOS) 5.5:A Technical Overview, Riverbed Technology, Inc., http://wvv.riverbed.com/ 2008.

* cited by examiner

Figure 3
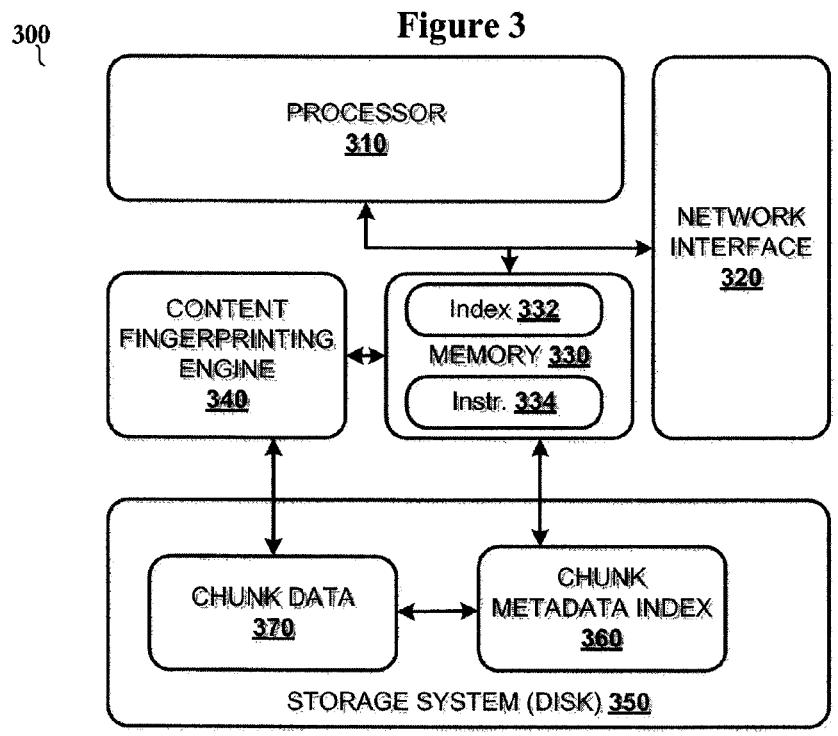
Figure 4: Multi-Resolution Chunking
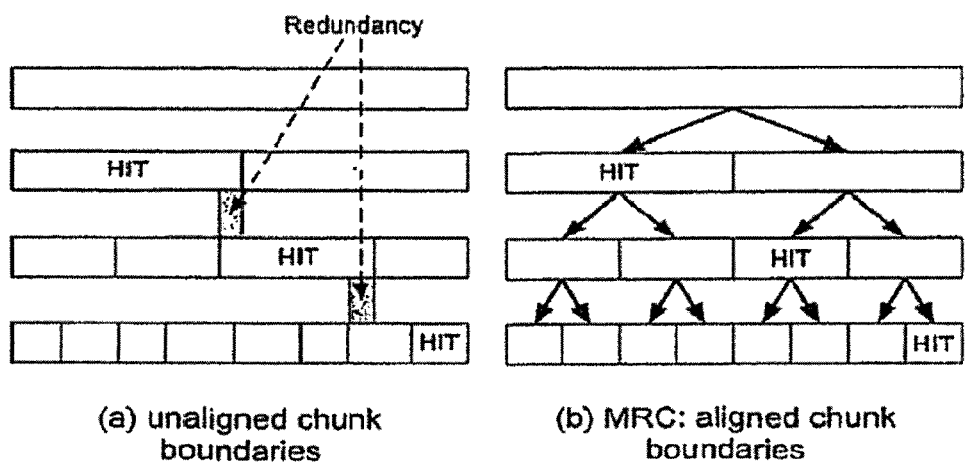
(a) unaligned chunk boundaries
(b) MRC: aligned chunk boundaries

Figure 5: Comparison of Chunking Schemes

| Scheme | Compression Rate | Disk I/O | Memory Pressure | Index Update |
|---|---|---|---|---|
| SRC-Small | High | High | High | Simple |
| SRC-Large | Low | Low | Low | Simple |
| MRC-Small | High | High | High | Complex |
| MRC-Large | High | Low | High | Complex |
| MRC | High | Low | Low | Simple |

Algorithm 1 Intelligent Load Shedding

Require: $C$: all the chunk names to be scheduled
602   $BW$, $RTT$: link bandwidth and RTT
604   $Q_i$: # of pending disk requests for peer $i$
606   $B_i$: pending network bytes to receive for peer $i$
608   $S$: per chunk disk latency
610   1: partition $C$ with HRW
612   2: resolve $C$ with *chunk peek* message in parallel
614   3: generate the candidate list
        $D_i$: cache-hit chunks on peer $i$
        $N$: cache-miss chunks
616   4: estimate each latency
618   $T_{D_i} = (|D_i| + Q_i) \times S$
620   $T_N = RTT + \{\sum_i B_i + \sum_{c \in N} length(c)\}/BW$
622   5: while $max(T_{D_i}) > T_N$ do
      6:   pick the peer $k$ where $max(T_{D_i}) = T_{D_k}$
      7:   move the smallest chunk from $D_k$ to $N$
      8:   update $T_{D_k}$ and $T_N$
624   9: end while
     10: return $D_i$ and $N$ Figure 7
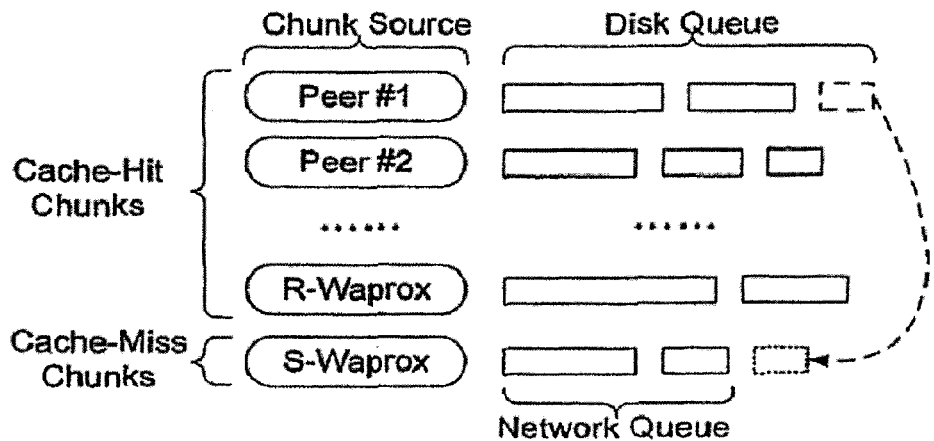
Figure 8: Potential Bandwidth Savings (d:degree)
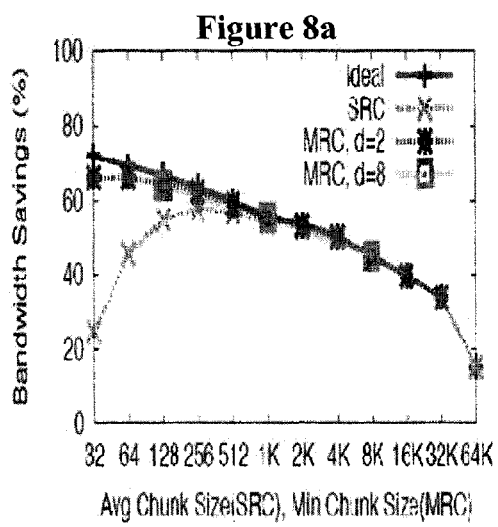
(a) News Sites
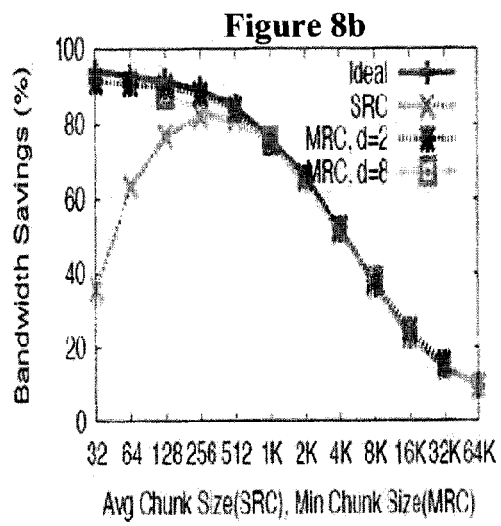
(b) Linux Kernel Figure 9: Disk Operation Cost (d:degree)
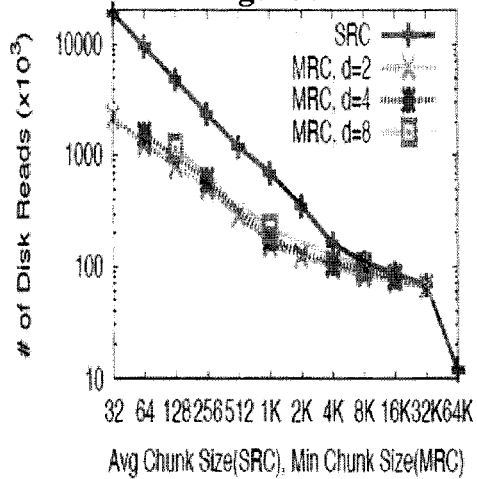
(a) News Sites
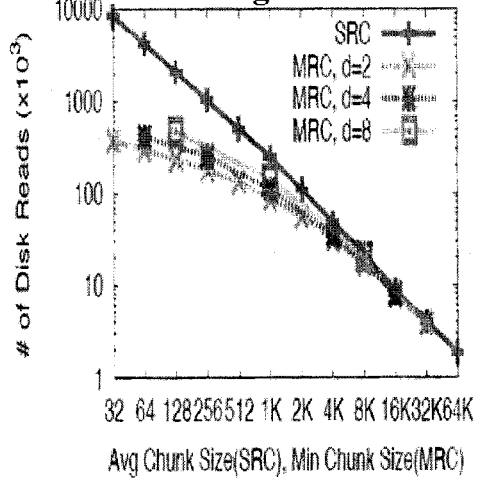
(b) Linux Kernel
Figure 10: Memory Footprint Comparison
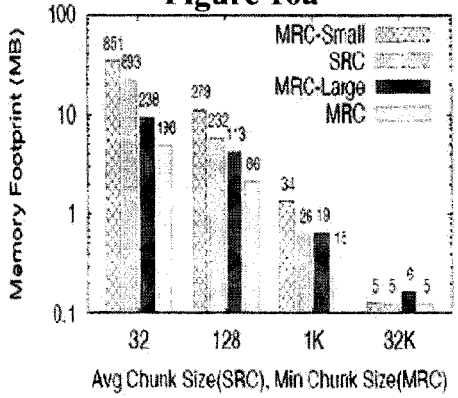
(a) News Sites
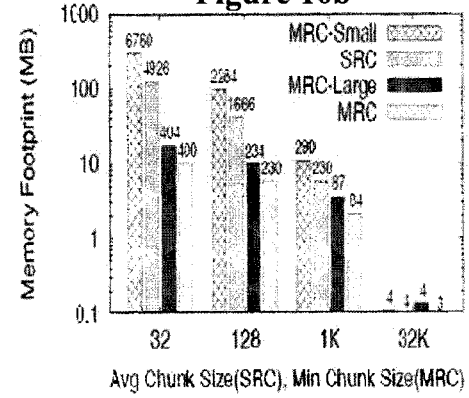
(b) Linux Kernel

Figure 11: MRC Computation Overhead for 64KB Block

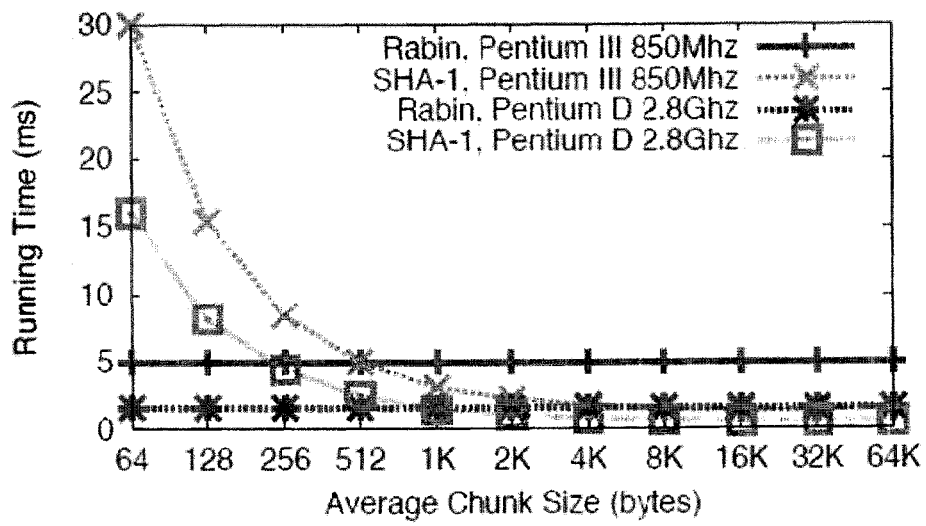

Figure 20

| Policy | Bits Per Object | RAM GB per Disk TB | Read Seeks | Write Seeks | Miss Seeks | Comments |
|---|---|---|---|---|---|---|
| Squid | 576-832 | 9 - 13 | ~6 | ~6 | 0 | Harvest descendant |
| Commercial | 256-544 | 4 - 8.5 | <1 | ~0 | 0 | custom filesystem |
| HC-Basic | 0 | 0 | 1 | 1 | 1 | high collision rate |
| HC-Set | 0 | 0 | 1 | 1 | 1 | adds N-way sets to reduce collisions |
| HC-SetMem | 11 | 0.17 | 1 | 1 | 0 | small in-mem hash eliminates miss seeks |
| HC-SetMemLRU | <11 | <0.17 | 1 | 1 | <1 | only some sets kept in memory |
| HC-Log | 47 | 0.73 | 1 | ~0 | 0 | writes to log, log position added to entry |
| HC-LogLRU | 15-47 | 0.23 - 0.67 | 1 + ε | ~0 | 0 | log position for only some entries in set |
| HC-LogLRU - Prefetch | 23-55 | 0.36 - 0.86 | <1 | ~0 | 0 | reads related objects together |
| HC-Log + Prefetch | 55 | 0.86 | <1 | ~0 | 0 | reads related objects together |

HashCache-Basic

Figure 13: HashCache Basic
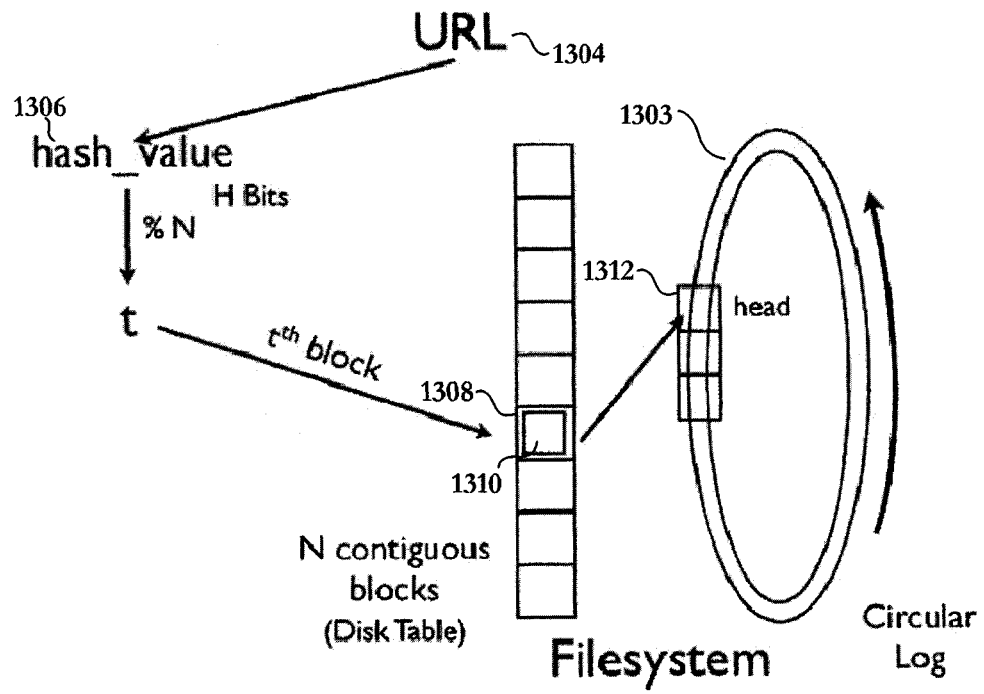
Figure 15: HashCache Set
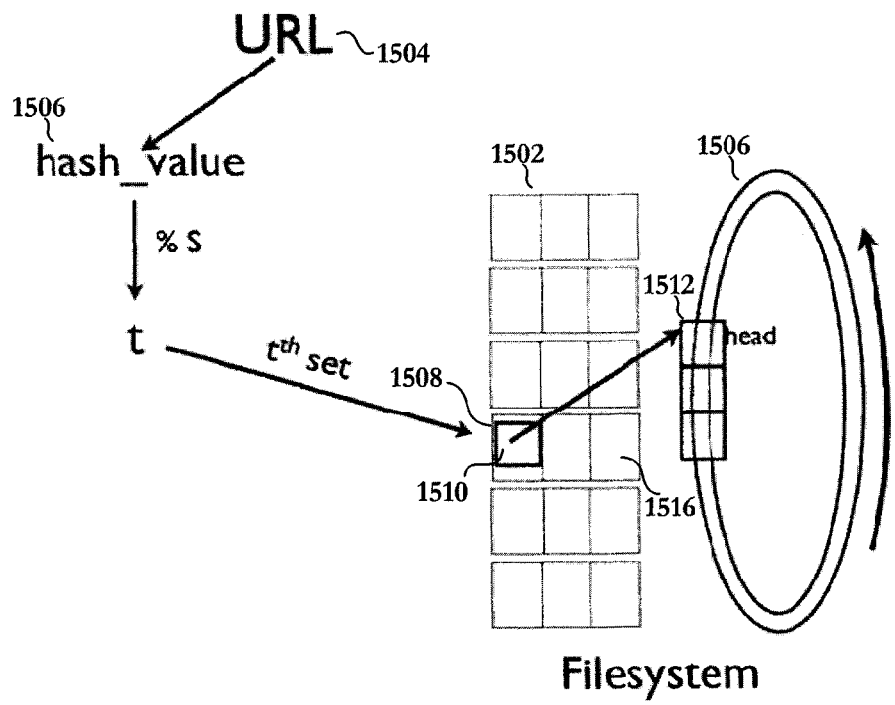

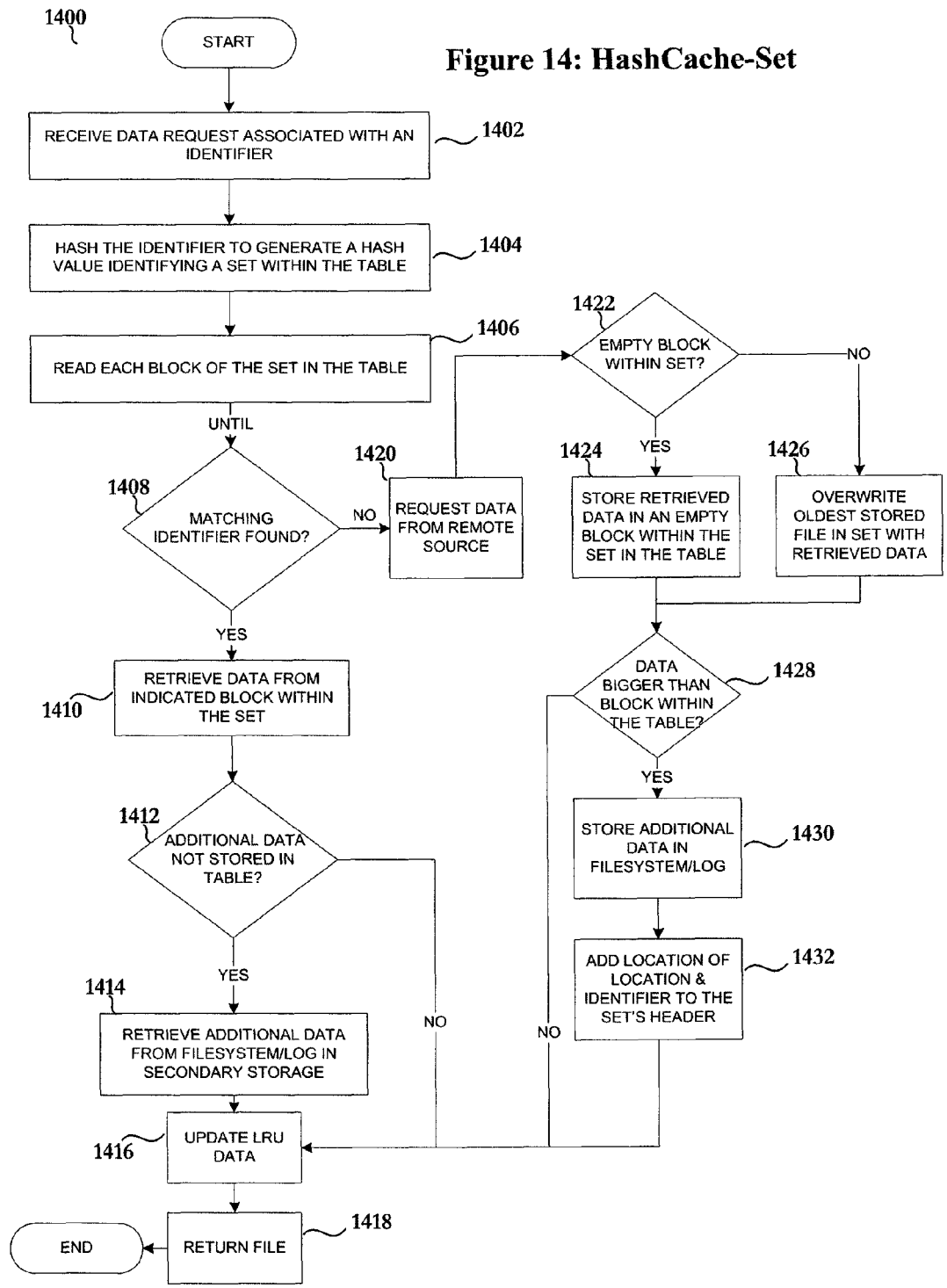
Figure 14: HashCache-Set

HASHCACHE SET-MEM

Figure 17: HashCache Set-Mem
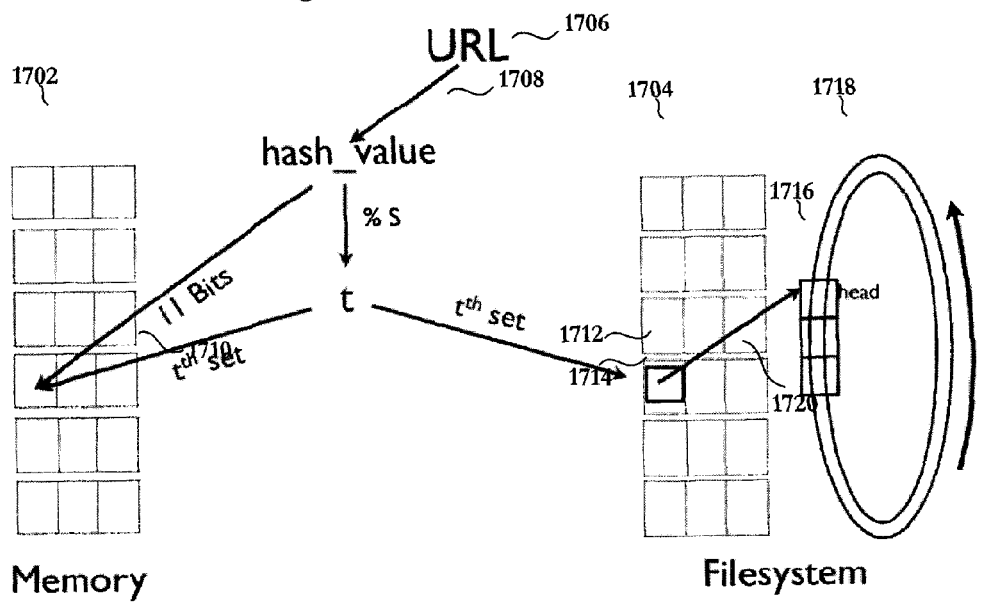
Figure 19: HashCache Log
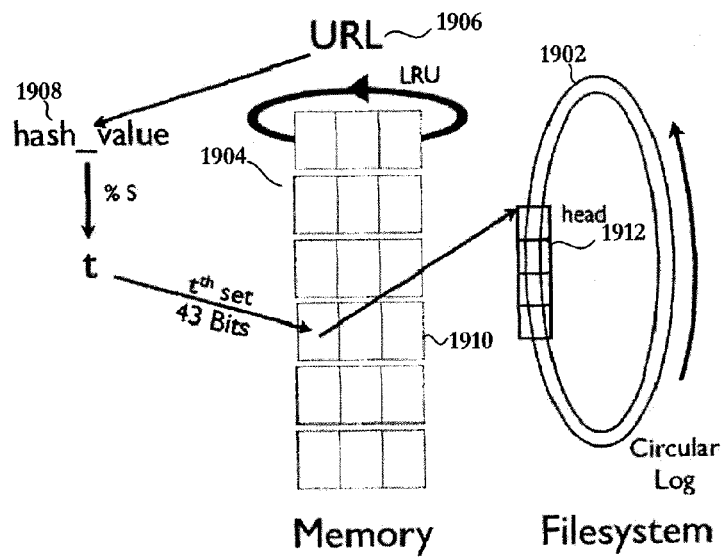

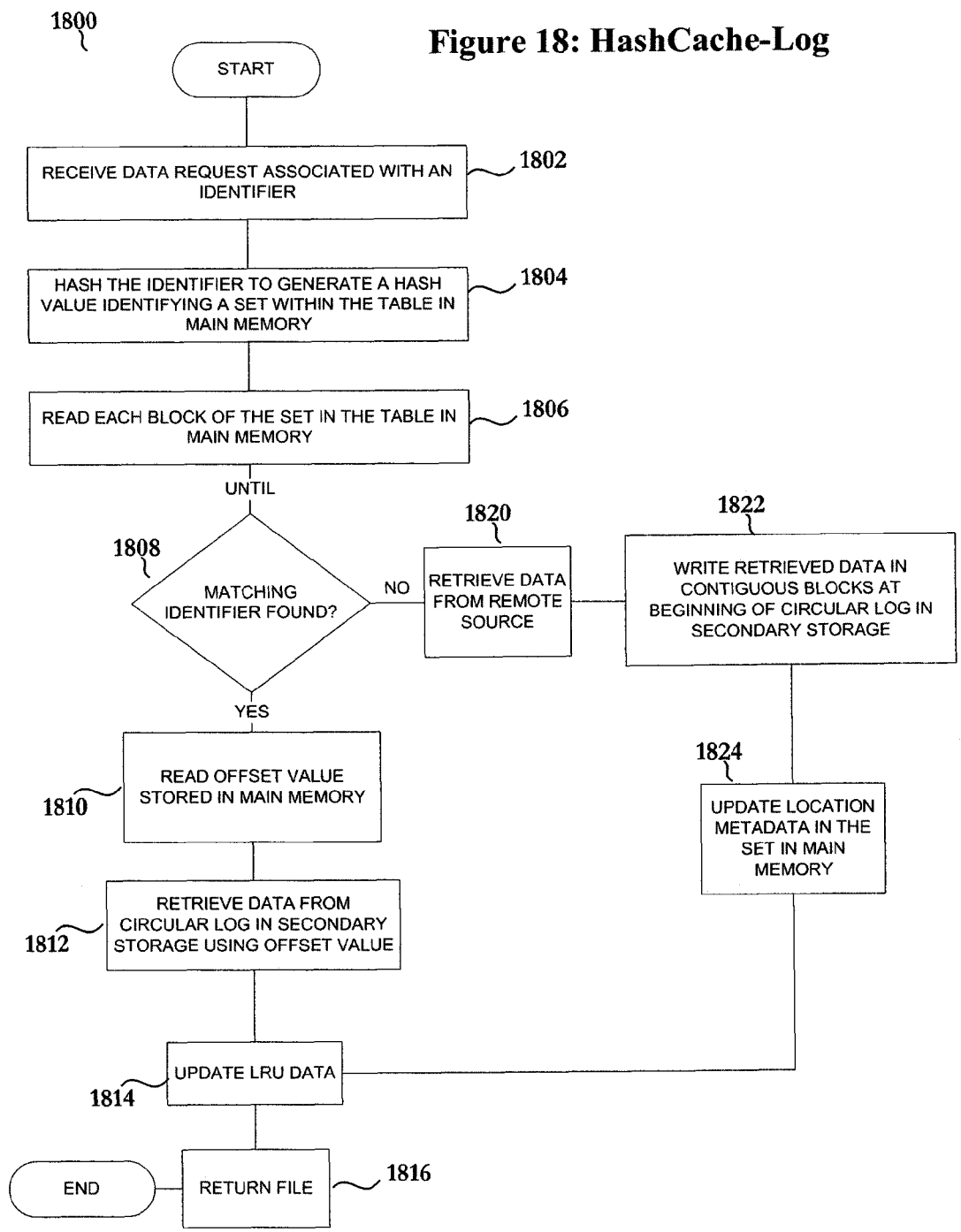
Figure 18: HashCache-Log

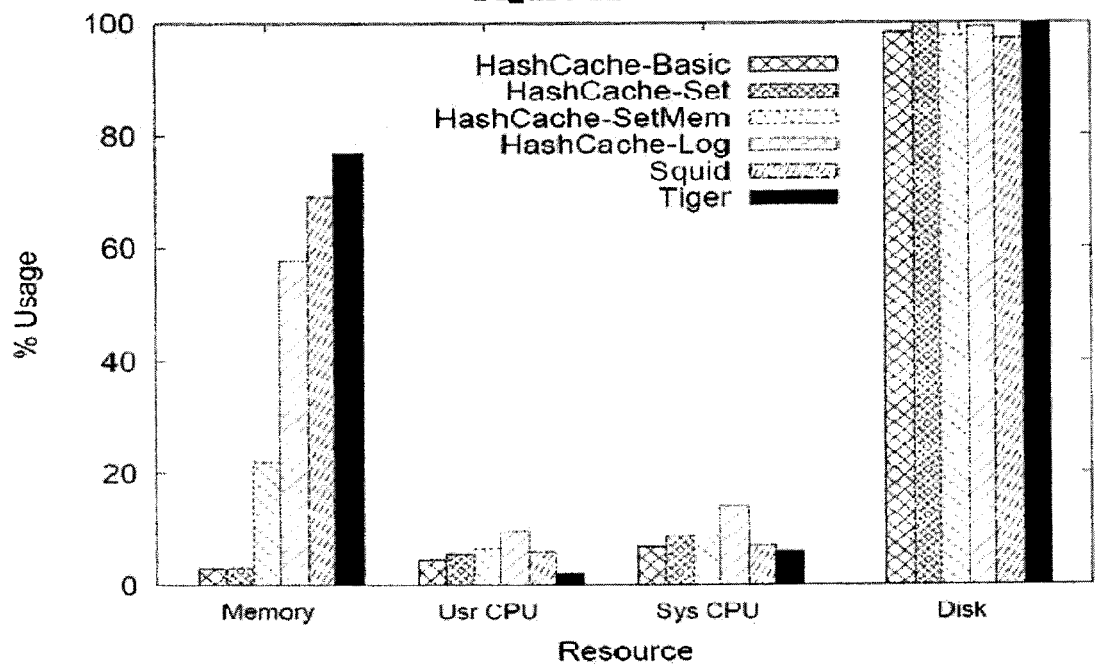

Figure 21

| Policy | Throughput |
|---|---|
| HC-Basic | $rr = \dfrac{t}{1+\frac{1}{rel}+(1-chr)\cdot cbr}$ |
| HC-Set | $rr = \dfrac{t}{1+\frac{1}{rel}+(1-chr)\cdot cbr}$ |
| HC-SetMem | $rr = \dfrac{t}{chr\cdot\left(1+\frac{1}{rel}\right)+(1-chr)\cdot cbr}$ |
| HC-LogN | $rr = \dfrac{t}{2\cdot chr+(1-chr)\cdot cbr}$ |
| HC-LogLRU | $rr = \dfrac{t\cdot rel}{2\cdot chr+(1-chr)\cdot cbr}$ |
| HC-Log | $rr = \dfrac{t\cdot rel}{2\cdot chr+(1-chr)\cdot cbr}$ |
| Commercial | $rr = \dfrac{t\cdot rel}{2\cdot chr+(1-chr)\cdot cbr}$ |

Figure 22

SYSTEMS AND METHODS FOR NETWORK ACCELERATION AND EFFICIENT INDEXING FOR CACHING FILE SYSTEMS

CROSS-REFERENCE TO RELATED APPLICATIONS

The present application claims the benefit of PCT International Application No. PCT/US10/28072, filed 20 Mar. 2010; which claims the benefit of U.S. Provisional Application Ser. No. 61/161,887 filed Mar. 20, 2009, and U.S. Provisional Application Ser. No. 61/211,203 filed Mar. 26, 2009, each of which are herby incorporated by reference in their entireties.

STATEMENT REGARDING FEDERALLY SPONSORED RESEARCH OR DEVELOPMENT

This invention was made with government support under CNS-0615237, CNS-0519829, and CNS-0520053 awarded by the National Science Foundation. The Government has certain rights in the invention.

BACKGROUND OF THE INVENTION

1. Field of the Invention

The present application relates generally to data storage and retrieval, and more particularly, to systems and methods for network acceleration and efficient indexing for caching file systems.

2. Description of Related Art

While low-cost laptops may soon improve computer access for the developing world, their widespread deployment will increase the demands on local networking infrastructure. Locally caching static Web content can alleviate some of this demand, but this approach has limits on its effectiveness, especially in smaller environments.

One option for augmenting Web caches is to use wide area network (WAN) accelerators, devices that compress redundant traffic passing between them, using custom protocols. These devices are application-independent, and can improve the latency and effective bandwidth seen by clients using slow network links. In first-world environments, these devices are commonly used to accelerate communications between a central office and branch offices connected via low-speed WAN links.

WAN accelerators are deployed near edge routers, and work by transparently intercepting and modifying traffic to destinations with other WAN accelerators. Traffic to destinations without WAN accelerators is passed through the device unmodified, preserving transparency. For intercepted traffic, the accelerators typically break the data stream into smaller chunks, store these chunks at each accelerator, and then replace future instances of this data with reference to the cached chunks. By passing references to the chunks rather than the full data, the accelerator compresses the data stream.

Another option for augmenting network caches is to improve the cache storage engine. Large enterprises and ISPs particularly benefit from network caches because they can amortize their cost and management over larger user populations. Cache storage system design has been shaped by this class of users, leading to design decisions that favor first-world usage scenarios. However, because disk size has been growing faster than RAM sizes, it is now much cheaper to buy terabytes of disk than a machine capable of indexing that much storage, since most low-end servers have lower memory limits. This disk/RAM linkage makes existing cache storage systems problematic for developing world use, where it may be very desirable to have terabytes of cheap storage (available for less than US $100/TB) attached to cheap, low-power machines. However, if indexing a terabyte of storage requires 10 GB of RAM (typical for current proxy caches), then these deployments will require server-class machines, with their associated costs and infrastructure. Worse, this memory is dedicated for use by a single service, making it difficult to deploy consolidated multi-purpose servers. This situation is especially unfortunate, since bandwidth in developing regions is often more expensive, both in relative and absolute currency, than it is in the US and Europe.

SUMMARY

The problems presented by existing WAN accelerators and network caching systems are solved by the systems and methods of the illustrative embodiments described herein. For instance, in one embodiment, a method for accelerating data retrieval over a data network is presented. The method includes receiving, by a first proxy device, a request for data sent from an end user device to a source data device. A connection is established by the first proxy device with a second proxy device. The second proxy device is in communication with the source data device. The request for the data is transmitted by the first proxy device to the second proxy device. The second proxy device forwards the request to the source data device and receives the data from the source data device. The first proxy device receives a plurality of chunk names corresponding to a plurality of data chunks generated by the second proxy device from the received data. The first proxy device determines whether a local data storage unit contains one or more of the plurality of data chunks using the plurality of chunk names. In response to a determination that the local data storage unit does not contain one or more of the plurality of data chunks associated with the plurality of chunk names, the first proxy device determines an optimized retrieval schedule for retrieving the plurality of data chunks associated with the plurality of chunk names. For example, in some embodiments, the first proxy device may determine which local peer device to request a non-locally stored data chunk associated with the plurality of chunk names. Additionally, in some embodiments, the first proxy device may retrieve a locally stored data chunk over a wide-area network instead of locally from a local area network peer device or from a local data storage if overall performance is increased. The first proxy device provides the data to the end user device after retrieving the plurality of data chunks associated with the plurality of chunk names.

In another embodiment, a method for storing and retrieving data is presented. The method includes arranging a secondary storage device to include a table of contiguous blocks and a filesystem. The filesystem may be one of a log filesystem or a regular filesystem with hierarchical directories. The method hashes an identifier associated with a data request for a requested file (e.g., a URL associated with a web object) to generate a hash value that identifies a location within the table. The method reads the location within the table to determine whether a file exists at the location. If a file exists at the location, the method uses metadata associated with the existing file to compare an identifier of the existing file to the identifier associated with the data request to determine if it's a file hit. If it is a file hit, the method determines whether the file includes additional data stored on the filesystem. The method retrieves the additional data from the filesystem, if any, and returns the requested file to a requesting device.

In still another embodiment, a method for storing and retrieving data includes arranging a secondary storage device to include a table having a plurality of sets of contiguous blocks and a filesystem. The method hashes an identifier associated with a data request for a requested file to generate a hash value identifying a set within the table and determines whether a block within the set contains a matching identifier to the identifier associated with the data request. In response to a determination that a block contains a matching identifier to the identifier associated with the data request, the method retrieves the requested file from the block within the set. If there is additional data associated with the requested file not stored in the block, the method retrieves the additional data from the filesystem. The requested file is returned to a requesting device.

In yet another embodiment, a method for storing and retrieving data includes arranging a secondary storage device to include a table having a plurality of sets of contiguous blocks and a filesystem. The method also arranges in main memory a corresponding table having the plurality of sets of contiguous blocks. The method hashes an identifier associated with a data request for a requested file to generate a hash value identifying a set within the table. The method determines whether a block within the set in the corresponding table in main memory contains a matching identifier to the identifier associated with the data request. In response to a determination that the set in the corresponding table in main memory contains a matching identifier, the method retrieves the requested file from a corresponding block within the set on the secondary storage device. In addition, the method retrieves additional data, if any, from the filesystem, and returns the requested file to a requesting device.

Further, in another embodiment, a method for storing and retrieving data includes arranging a secondary storage device to include a circular log filesystem and arranging in main memory a table having a plurality of sets of contiguous blocks. The method hashes an identifier associated with a data request for a requested file to generate a hash value identifying a set within the table, and determines whether a block in the set of the table in main memory contains a matching identifier to the identifier associated with the data request. In response to a block in the set of the table in main memory contains a matching identifier to the identifier associated with the data request, the method identifies a location of the requested file stored on the circular log filesystem. The method retrieves the requested file from the location of the circular log filesystem within the secondary storage device and returns the requested file to a device requesting the data.

In addition, the disclosed embodiments include an apparatus and computer program product that performs one or more of the above methods. Other objects, features, and advantages of the illustrative embodiments will become apparent with reference to the drawings and detailed description that follow.

BRIEF DESCRIPTION OF THE DRAWINGS

FIG. 3 is a schematic illustrating a system architecture according to an illustrative embodiment;

FIG. 4 illustrates multi-resolution chunking (MRC) scheme according to an illustrative embodiment;

FIG. 5 illustrates a table comparing several chunking schemes according to an illustrative embodiment;

FIG. 6 illustrates an algorithm for intelligent load shedding according to an illustrative embodiment;

FIG. 7 is a schematic diagram illustrating the intelligent load shedding depicted in FIG. 6 according to an illustrative embodiment;

FIG. 8 illustrates potential bandwidth savings using the multi-resolution chunking scheme according to an illustrative embodiment;

FIG. 9 illustrates disk operation cost using the multi-resolution chunking scheme according to an illustrative embodiment;

FIG. 10 illustrates memory footprint comparison using the multi-resolution chunking scheme according to an illustrative embodiment;

FIG. 11 illustrates multi-resolution chunking computation overhead for a 64 KB block according to an illustrative embodiment;

FIG. 13 is a schematic diagram illustrating the process of FIG. 12 according to an illustrative embodiment;

FIG. 14 is a flowchart illustrating another process for storing and retrieving data from an object cache according to an illustrative embodiment;

FIG. 15 is a schematic diagram illustrating the process of FIG. 14 according to an illustrative embodiment;

FIG. 17 is a schematic diagram illustrating the process of FIG. 12 according to an illustrative embodiment;

FIG. 18 is a flowchart illustrating yet another process for storing and retrieving data from an object cache according to an illustrative embodiment;

FIG. 19 is a schematic diagram illustrating the process of FIG. 12 according to an illustrative embodiment;

FIG. 20 is a table comparing the above processes for storing and retrieving data from an object cache according to an illustrative embodiment;

FIG. 21 is a table depicting the throughput implications for the above processes for storing and retrieving data from an object cache according to an illustrative embodiment; and FIG. 22 is a chart depicting the resource usage for the above processes for storing and retrieving data from an object cache according to an illustrative embodiment.

DETAILED DESCRIPTION OF ILLUSTRATIVE EMBODIMENTS

In the following detailed description of several illustrative embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Figure 1:
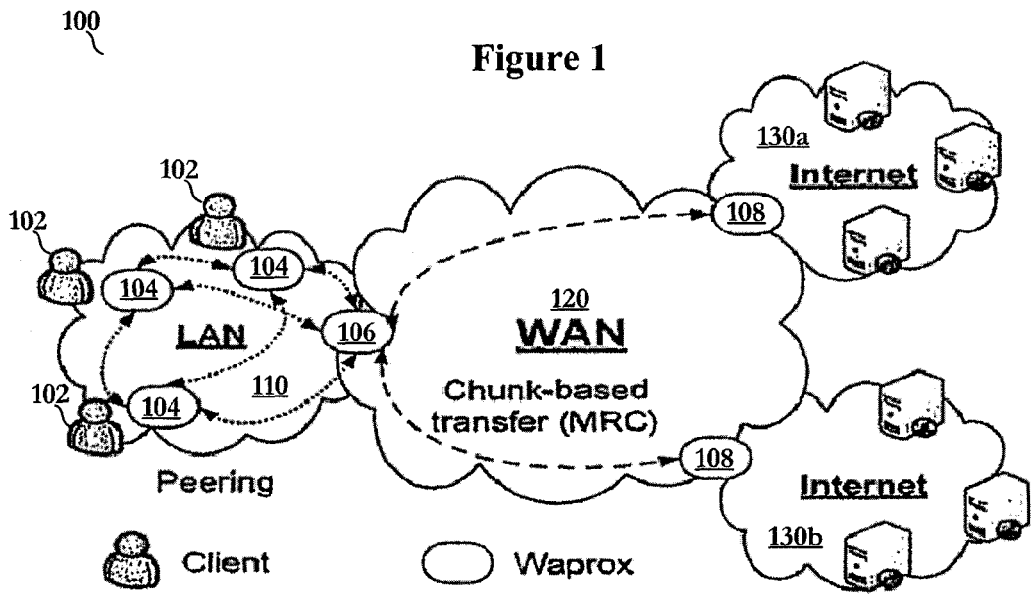
FIG. 1 illustrates a network environment in which the illustrative embodiments may be implemented.

Referring to FIG. 1, an illustrative network environment 100 in which the disclosed embodiments may be implemented is presented. Network environment 100 comprises a local area network (LAN) 110, a wide area network (WAN)

120, and Internet networks 130a and 130b. Local area network 110 provides data connectivity to client devices 102 such as personal computers, laptops, and PDA devices. As referenced herein, a Waprox is a proxy device that also provides WAN acceleration. A proxy device as used herein refers to a physical computer having at least a processor, memory, and a data storage component (may be external), that acts as an intermediary between a content requesting device (e.g., client devices 102) and a content providing device (e.g., a web server). The proxy device may include dedicated hardware or one or more processors that execute software, and/or a combination of both for providing features, such as, but not limited to, security, administrative control, and/or caching services.

In accordance with the disclosed embodiments, local area network 110 includes one or more Waproxs 104 for accelerating data retrieval for one or more of the client devices 102. In one embodiment, the local area network 110 is a mesh network environment that enables the Waproxs 104 to communicate directly with each other for exchanging data. However, the local area network 110 may be implemented as a star topology or any other topology that enables the nodes to communicate with each other in various ways. In addition to the Waproxs 104 within local area network 110, a Waprox 106 is deployed near an edge router between local area network 110 and wide area network 120. The Waprox 106 acts as a gateway Waprox between the Waproxs 104 in the local area network 110 and Waproxs 108 in the wide area network 120. Waproxs 108 are deployed near an edge router between wide area network 120 and the Internet networks 130a and 130b and acts as an Internet gateway/Waprox for Waprox 106.

As used herein, reference to "the Waproxs" refers to any one or all of the Waproxs 104, 106, and 108. For instance, the Waproxs are designed around four goals—(1) maximize compression, (2) minimize disk seeks, (3) minimize memory pressure, and (4) exploit local resources. The terms "local resources" and "local peer devices" may include physically proximate machines that may technically be on other networks that are less expensive to utilize than the wide area network 120.

The Waproxs are configured to compress redundant traffic between a pair of Waproxs—one near the clients, called a R-Waprox, and one closer to the content, called an S-Waprox. For example, redundant traffic may be compressed between Waproxs 108 (acting as the S-Waprox) and Waprox 106 (acting as the R-Waprox), or between Waprox 106 (acting as the S-Waprox) and a Waprox 104 (acting as the R-Waprox). For developing regions, the S-Waprox is likely to be placed where bandwidth is less expensive than bandwidth near the client devices 102.

In one embodiment, in which the Waproxs usage is mostly Web related, the Waproxs operates on TCP streams rather than IP packets because buffering TCP flows can yield larger regions for content fingerprinting. Content fingerprinting (CF) forms the basis for WAN acceleration by providing a position-independent and history-independent technique for breaking a stream of data into smaller pieces, or chunks, based only on their content. In a preferred embodiment, the Waproxs utilizes Rabin's fingerprinting technique to generate integer values, or fingerprints, over a sliding window (e.g., 48 bytes) of a byte stream. When a fingerprint matches a specified global constant, that region constitutes a chunk boundary. The average chunk size can be controlled with a parameter n, which defines how many low-order bits of K are used to determine chunk boundaries. In the average case, the expected chunk size is $2^n$ bytes. To prevent chunks from being too large or too small, minimum and maximum chunk sizes can be specified. Since Rabin's fingerprinting technique determines chunk boundaries by content, rather than offset, localized changes in the data stream only affect chunks that are near the changes. Once a stream has been chunked, the Waproxs can cache the chunks and pass references/chunk identifiers (such as SHA-1 hashes) to previously cached chunks, regardless of their origin, to a local Waprox. As a result, the Waproxs can compress within a stream, across streams, and even across files and protocols. If the local Waprox has the chunks cached, the data is reassembled and delivered to the client devices 102. Any chunks that are not cached can be fetched from a remote Waprox (e.g., Waproxs 108) or other nearby/local peer devices (e.g., Waprox 104). Although Rabin's fingerprinting technique is described above as a preferred fingerprinting technique, the Waproxs may utilize other content fingerprinting techniques including, but not limited to, Manber's anchor technique to determine chunk boundaries.

Figure 2:
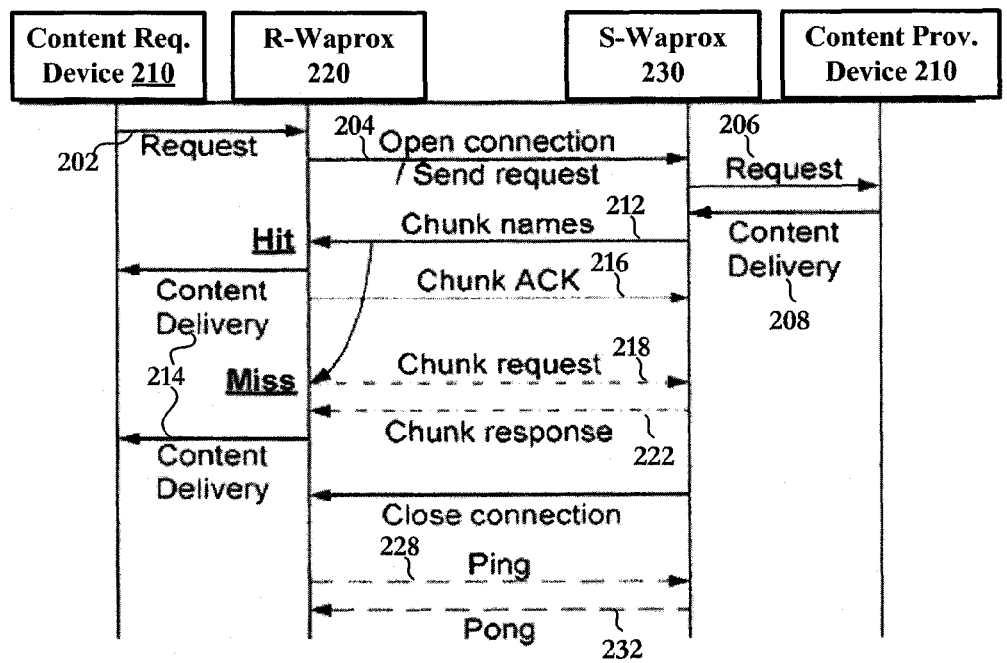
FIG. 2 is a sequence diagram illustrating communication exchanges between the systems depicted in FIG. 1 according to an illustrative embodiment.

FIG. 2 illustrates an example of a data transfer between a content requesting device 210, a R-Waprox 220, a S-Waprox 230, and a content providing device 240. The content requesting device 210 may be a Waprox 104 and/or a client device 102. The R-Waprox 220 and the S-Waprox 230 are gateway Waproxs such as Waprox 106 and Waproxs 108 respectively. The Waproxs use three kinds of communication channels between the Waproxs, a control channel, a data channel, and a monitoring channel. The control channel is used for connection management and chunk name exchange. For instance, in one embodiment, when the content requesting device 210 initiates a TCP connection for sending a data request 202 to the content providing device 240 over the wide area network 120, that connection is transparently intercepted by the R-Waprox 220. In other embodiments, the content requesting device 210 may be configured to explicitly send traffic, such as, but not limited to, all HTTP requests, to the R-Waprox 220. In certain embodiments, the R-Waprox 220 may receive the data request 202 via a router that is configured to send certain traffic to the R-Waprox 220 automatically. In one embodiment, the R-Waprox 220 does not intercept non-cacheable protocols (e.g., SSH, HTTPS). The R-Waprox 220 selects the S-Waprox 230 which is network topologically closer to the content providing device 240, and sends it an open connection message 204 with the IP and port number of the content providing device 240. With this information, the S-Waprox 230 opens a TCP connection and sends a data request 206 to the content providing device 240 and a logical end-to-end user connection between the content requesting device 210 and the content providing device 240 is established.

When the content providing device 240 sends data 208 back to the S-Waprox 230, the S-Waprox 230 generates chunk names from the data 208 and sends the chunk names to the R-Waprox 220 in a chunk name message 212. As will be further described in FIG. 3, the Waproxs utilizes a novel multi-resolution chunking technique that enables multiple chunk sizes to co-exist in the system. The chunk name message 212 contains a sequence number so that the R-Waprox 220 can reconstruct the original content in the right order. After the R-Waprox 220 reconstructs and delivers the chunk data 214 to the content requesting device 210, the R-Waprox 220 sends a chunk acknowledgment (ACK) message 216 to the S-Waprox 230. The S-Waprox 230 can then safely discard the delivered chunks from its memory, and proceed with sending more chunk names.

When the content requesting device 210 or the content providing device 240 closes the connection, the corresponding Waprox sends a close connection message 226 to other gateway and the connections between the gateways and the clients are closed once all the data is delivered. The control channel, however, remains connected. All control messages carry their logical end-to-end flow identifiers, so one control channel can be multiplexed for many simultaneous data flows. Control messages can be piggybacked on each other for efficiency.

The data channels are used to request and deliver uncached chunks, so it is stateless and implemented as a simple request-reply protocol. For instance, the data channel uses chunk request messages 218 and chunk response messages 222 to deliver the actual chunk content in case of a cache miss at the R-Waprox 220. In some embodiments, the S-Waprox 230 may send a chunk peek message (not depicted) which is used to query if a given chunk is cached by the R-Waprox 220 for providing intelligent load shedding as will be further described.

Finally, the monitoring channel is used for checking the liveness and load levels of the peers using a simple heartbeat protocol. The Waproxs monitors the status of its peers by exchanging heartbeats 228 on the monitoring channel. The heartbeat response 230 carries the load level of disk and network I/Os of the peer so that the request load may be balanced among peer devices.

FIG. 3 is a schematic diagram illustrating a system architecture of a Waprox 300 according to an illustrative embodiment. The Waprox 300 includes a processor 310, a network interface 320 for enabling the Waprox 300 to send and receive data over the network environment 100, memory 330 (also referred to herein as main memory), a content fingerprinting engine 340 for performing Rabin's fingerprinting technique as described above, and a data storage system 350 such as a hard disk (also referred to herein as secondary storage). Processor 310 may be any type of microprocessor and/or dedicated circuitry capable of executing instructions 334 stored in memory 330.

Chunk data 370 is stored on the data storage system 350 due to cost and capacity. For example, the data storage system 350 of the Waprox 300 would typically be a Terabyte or bigger. In addition to the chunk data 370, in some embodiments, the data storage system 350 may also store a chunk metadata index 360 that contains data describing the chunks stored in the chunk data 370. For example, the chunk metadata index 360 may include header information, attributes, and link relationships. Although FIG. 3 illustrates the chunk metadata index 360 residing entirely on the data storage system 350, in some embodiments, the chunk metadata index 360 may partially or entirely reside in memory 330. In some embodiments, a cache index 332 of the chunk metadata is partially or completely kept in memory to avoid disk accesses. However, in certain embodiments, memory 330 may be completely void of the cache index 332. Memory 330 may also serve as a cache for chunk data to reduce disk access for commonly-used content.

The performance of the Waproxs is mainly determined by three factors—(1) compression rate, (2) disk performance, and (3) memory pressure. Compression rate refers to the fraction of physically transferred data (chunk references) of the original data and reflects network bandwidth savings by receiver-side caching. Disk performance determines the cached chunk access time (seek time) while memory pressure affects the efficiency of the chunk index and in-memory cache management. These three factors affect the total latency, which is the time to reconstruct and deliver the original data. To achieve high effective bandwidth, the Waproxs reduce total latency while achieving high compression, low disk seeks, and low memory pressure simultaneously.

Chunk size directly impacts all of the three factors above, and consequently the effective bandwidth as well. A small chunk size can lead to better compression if changes are fine-grained, such as a word being changed in a paragraph. Only the chunk containing the word is modified, and the rest of the paragraph can be compressed. However, for the same storage size, smaller chunks create more total chunks, increasing the metadata index size, and increasing the memory pressure and disk seeks. Large chunks yield fewer chunks total, reducing memory pressure and providing better disk usage since each read can provide more data. Large chunks, however, can miss fine-grained changes, leading to lower compression. No standard chunk size is apparent in systems that use content fingerprinting—for example, 2 KB, 8 KB, and 16 KB chunk sizes have been used by other WAN accelerators.

The disclosed Waprox combines the advantages of both large and small chunks by allowing multiple chunk sizes to co-exist in the system using a technique hereinafter referred to as Multi-Resolution Chunking (MRC). The Waproxs use MRC to achieve (1) high compression rate, (2) low disk seeks, and (3) low memory pressure. When content overlap is high, Waprox can use larger chunks to reduce disk seeks and memory pressure. However, when larger chunks miss compression opportunities, Waprox uses smaller chunk sizes to achieve higher compression. In contrast, existing WAN accelerators typically use a fixed chunk size, which we term single-resolution chunking, or SRC.

Generating multiple chunk sizes requires careful processing, not only for efficiency, but also to ensure that chunk boundaries are aligned. A naive approach to generating chunks can yield unaligned chunk boundaries, as shown in FIG. 4(a). Here, the fingerprinting algorithm was run multiple times with multiple sizes. However, due to different boundary detection mechanisms, chunk size limits, or other issues, the boundaries for larger chunks are not aligned with those of smaller chunks. As a result, when fetching chunks to reconstruct data, some areas of chunks overlap, while some chunks only partly overlap, causing wasted bandwidth when a partially-hit chunk must be fetched to satisfy a smaller missing range.

The Waproxs solves the above problem by performing a single-pass fingerprinting step, in which all of the smallest boundaries are detected, and then larger chunks are generated by matching different numbers of bits of the same boundary detection constraint. This process produces the MRC tree shown in FIG. 4(b), where the largest chunk is the root, and all smaller chunks share boundaries with some of their leaf chunks. Performing this process using one fingerprinting pass not only produces a cleaner chunk alignment, but also requires less CPU.

All chunks generated by the MRC process are stored to the data storage system 350, even though the smaller chunks contain the same data as their parent. The rationale behind this decision is based on the observation that disk space is cheap. In addition, having all chunks be fully independent simplifies the metadata indexing process, thus, reducing memory pressure in the system and minimizing disk seeks. For example, when reading a chunk content from the data storage system 350, MRC requires only one index entry access and only one disk seek.

Two other options would be to reconstruct large chunks from smaller chunks, which we call MRC-Small, and storing the smaller chunks as offsets into the root chunk, which we call MRC-Large. While both MRC-Small and MRC-Large can reduce disk space consumption by saving only unique data, they suffer from more disk seeks and higher memory pressure. To reconstruct a larger chunk, MRC-Small needs to fetch all the smaller chunks sharing the content, which can significantly increase disk access. The metadata for each small chunk is accessed in this process, increasing memory pressure compared to standard MRC with only one chunk entry. MRC-Large avoids multiple disk seeks but complicates chunk index management. When a chunk is evicted from disk or overwritten, all dependent chunks must also be invalidated. This requires either that each metadata entry grows to include all sub-chunk names, or that all sub-chunk metadata entries contain backpointers to their parents. MRC avoids these problems by making all chunks independent of each other. This choice greatly simplifies the design at the cost of more disk space consumption. For example, the Waproxs can store more than a month's worth of chunk data on a single 1 TB disk assuming a 1 Mbps WAN connection. FIG. 5 summarizes the tradeoffs of the different schemes.

When the R-Waprox 220 receives an MRC tree (chunk names only) from the S-Waprox 230, it builds a candidate list to determine which chunks can be fetched locally in data storage system 250, at local peer devices (e.g., Waproxs 104), and from the S-Waprox 230. To get this information, it queries its local cache and local peer devices for each chunk's status, starting from the root. In one embodiment, the R-Waprox 220 uses the in-memory cache index 332 to handle this query, thus, not requiring extra disk access. If a chunk is a hit, the R-Waprox 220 stops querying for any children of the chunk. For misses, the R-Waprox 220 finds the root of the subtree containing only misses and fetches the missing chunk from the S-Waprox 230. After reconstructing the content, the R-Waprox 220 stores each uncached chunk in the MRC to the data storage system 350 for future reference.

In addition, the S-Waprox 230 utilizes a novel chunk name hints optimization technique to predict chunk hits or misses at the R-Waprox 220 for pruning the MRC tree because sending the full MRC tree would waste bandwidth if there is a cache hit at a high level in the tree or when subtrees are all cache misses. Sending one level of the tree at a time avoids the wasted bandwidth, but increases the transmission latency with a large number of round trips. Instead, the S-Waprox 230 contains a hint table that contains recently-seen chunk names along with timestamps. Before sending the MRC tree, the S-Waprox 230 checks all chunk names against the hint table. For any hit in the hint table, the S-Waprox 230 avoids sending the subtrees below the chunk. If it is a miss or the chunk name hint is stale, the S-Waprox 230 determines the largest subtree that is a miss and sends one chunk content for the entire subtree, thus, eliminating any inefficiency exchanging MRC trees and further increasing effective compression rate. The S-Waprox 230 uses the timestamps to invalidate old hint entries. However, other mechanisms may also be used to invalidate old hint entries, such as invalidation messages between the Waproxs, or other forms of cache synchronization.

The Waproxs incorporate a peering mechanism to share the resources such as disks, memory, and CPU with nearby peers (e.g., Waproxs 104) using cheaper/faster local connectivity. It allows the Waproxs to distribute the chunk fetching load among the peers and utilize multiple chunk cache stores in parallel, improving performance. In comparison, existing WAN accelerators support only point-to-point communication.

To reduce scalability problems resulting from querying peers, the Waproxs use a variant of consistent hashing called Highest Random Weight (HRW). Regardless of node churn, HRW deterministically chooses the responsible peer for a chunk. HRW consumes small memory at the expense of more CPU cycles. However, other forms can be used, including other consistent hashing approaches, directory-based schemes, or query-based approaches.

Upon receiving the chunk name message from the S-Waprox 230, the R-Waprox 220 sends a chunk request message to its responsible peer Waprox. The message includes the missing chunk name and the address of the S-Waprox 230 from whom the name of the missing chunk originates. If the peer Waprox has the chunk, it sends the requested chunk content back to the R-Waprox 220 with a chunk response message. If not, the peer proxy can fetch the missing chunk from the S-Waprox 230, deliver it to the R-Waprox 220, and save the chunk locally for future requests. In some embodiments, if peers are not in the same LAN and could incur separate bandwidth cost, fetching the missing chunk falls back to the R-Waprox 220 instead of the peer device. After finishing data reconstruction, the R-Waprox 220 distributes any uncached chunk to its corresponding peers by sending a chunk put message in the data channel.

While chunk cache hits are desirable because they reduce bandwidth consumption, too many disk accesses may degrade the effective bandwidth by increasing the overall latency. This problem is exacerbated if disk performance is poor. Accordingly, the R-Waprox 220 utilizes an intelligent load shedding (ILS) scheme depicted in FIG. 6, which exploits the structure of the MRC tree and dynamically schedules chunk fetches to maximize the effective bandwidth given a resource budget. The intelligent load shedding (ILS) scheme opportunistically uses network bandwidth instead of queuing more disk requests if doing so would increase the overall latency. For example, by using the disk for larger chunks and fetching smaller chunks over the network, the R-Waprox 220 can sustain high effective bandwidth without disk overload.

With reference to FIG. 6, the intelligent load shedding (ILS) process 600 takes the link bandwidth (BW) and round-trip time (RTT) of the R-Waprox 220 as input 602. Each peer Waprox uses the monitoring channel to send heartbeats that contain its network and disk load status in the form of the number of pending disk requests (Qi) 604, and the pending bytes to receive from network (Bi) 606. In one embodiment, the R-Waprox 220 assume per-chunk disk read latency (S) 608, or seek time is uniform for all peers for simplicity.

Upon receiving the chunk names from the S-Waprox 230, the R-Waprox 220 runs the HRW algorithm to partition the chunk names (C) into responsible peers at step 610. Some chunk names are assigned to the R-Waprox 220 itself. Then the R-Waprox 220 checks if the chunks are cache hits by sending the chunk peek messages to the corresponding peers in parallel at step 612. Based on the lookup results, the R-Waprox 220 generates the candidate list at step 614. Note that this lookup and candidate list generation process (line 2 and 3 in FIG. 6) can be saved by name hints from the S-Waprox 230, which the R-Waprox 220 uses to determine the results without actual lookups. The next step in the ILS process 600 is estimating fetch latencies for the network and disk queues at step 616. From the candidate list, the ILS process 600 knows which chunks need to be fetched over network (network queue, N) and which chunks need to be fetched either from local disk or a peer (disk queues, Di). Based on this information, the ILS process 600 estimate the latency for each chunk source. For each disk queue, the estimated disk latency will be per-chunk disk latency (S) multiplied by the number of cache hits at step 618. For the network queue, the estimated network latency will be one RTT plus the total size of cache-miss chunks divided by BW at step 620. If there were pending chunks in the network or disk queues, each latency is accordingly adjusted. In one embodiment, the ILS process 600 assumes the latency between the R-Waprox 220 and peers is small. The final step in the ILS process 600 is balancing the expected queue latencies, but doing so in a bandwidth-sensitive manner at step 622. ILS process 600 decides whether some cache hit chunks should be moved from a disk queue to a network queue—since fetching chunks from each source can be done in parallel, the total latency will be the maximum latency among them. If the network is expected to cause the highest latency, the ILS process 600 stops at step 624 because no further productive scheduling is possible. When disk latency dominates, the ILS process 600 can reduce it by fetching some chunks from the network. The ILS process 600 chooses the smallest chunk because it reduces one disk seek latency while increasing the minimum network latency. The ILS process 600 updates the estimated latencies, and repeats this process until the latencies equalize, as shown in FIG. 7. After finishing the ILS process 600, the R-Waprox 220 distributes chunk request messages to corresponding peers. The R-Waprox 220 sends the requests in the order they appear in the candidate list, in order to avoid possible head-of-line (HOL) blocking. Note that the ILS process 600 works with both MRC and SRC. However, by being able to move the smallest chunk from the disk queue to the network queue (as illustrated in FIG. 7), MRC could further reduce the disk latency than SRC, which results in smaller overall latency. Accordingly, the ILS process 600 when combined with MRC's provides better overall disk performance and compression, and a drastic increase in effective bandwidth.

For example, FIG. 8 respectively illustrates the ideal and actual bandwidth savings on two types of workloads, dynamically generated Web content and redundant large files, using the MRC technique in comparison to SRC. The results were generated by a simulator that implements all of the Waprox designs mentioned above. For the dynamically generated Web content (FIG. 8a), the simulator selects a number of popular news sites. The simulator fetches the front pages every five minutes and measures the redundancy between the fetches. For simulating redundant large files (FIG. 8b), the simulator downloads two different versions of the Linux kernel source tar files, 2.6.26.4 and 2.6.26.5, one at a time and gather packet-level traces as well. The size of each tar file is about 276 MB, and the two files are 94% redundant.

As expected, the ideal bandwidth savings increases as the chunk size decreases. However, due to the chunk indexing metadata transmission overhead, the actual savings with SRC peaks at a chunk size of 256 bytes with 58% bandwidth savings on the news sites, and 82% on the Linux kernel. The bandwidth savings drops as the chunk size further decreases, and when the chunk size is 32 bytes, the actual savings is only 25% on the news sites and 36% on the Linux kernel.

On the other hand, MRC approaches the ideal savings regardless of the minimum chunk size. With 32 byte minimum chunks, it achieves close to the maximum savings on both workloads—about 66% on the news sites and 92% on the Linux kernel. This is because MRC uses larger chunks whenever possible and the chunk name hint significantly reduces metadata transmission overheads. When comparing the best compression rates, MRC's effective bandwidth is 125% higher than SRC's on the Linux kernel while it shows 24% improvement on the news sites.

MRC's reduced per-chunk indexing overhead becomes clearer if we look at the number of disk I/Os for each configuration, shown in FIG. 9. SRC's disk fetch cost increases dramatically as the chunk size decreases, making the use of small chunks almost impossible with SRC. MRC requires far fewer disk operations even at small chunk sizes. When the leaf node chunk size is 32 bytes, SRC performs 8.5 times as many disk operations on the news sites (illustrated in FIGS. 9a), and 22.7 times more on the Linux kernel (FIG. 9b).

Memory pressure directly limits the amount of cache storage that a WAN accelerator can serve at high speed and the amount of memory it requires for that storage. FIGS. 10a and 10b compare the memory footprint with different chunking approaches. The simulator counts the number of chunk index entries that are used during the simulation and calculates the actual memory footprint. Each bar represents the memory footprint (MB). The numbers on top of each bar show the number of used cache entries in thousands. Due to space constraints, the simulator shows only the MRC trees with the degree 2, but other results follow the same trend.

MRC incurs much less memory pressure than SRC does because MRC requires one cache entry for any large chunk while SRC needs several cache entries for the same content. MRC-Small, however, requires even more cache entries than SRC does since reconstructing a larger chunk requires accessing all of its child entries. At a 32-byte chunk size, MRC-Small consumes almost 300 MB for the Linux kernel while MRC requires only about 10 MB for the cache entries. MRC-Large shows a similar number of cache entries as MRC. However, the actual memory consumption of MRC-Large is much worse than MRC because every child chunk has a back pointer to its parent. MRC-Large consumes almost twice as much memory as MRC on the news workload.

While MRC preserves high bandwidth savings without sacrificing disk performance, it consumes more CPU cycles in fingerprinting and hash calculation due to an increased number of chunks. FIG. 11 shows average time for running Rabin's fingerprinting algorithm and SHA-1 on one chunk with an average size of 64 KB from a 10 MB file. Rabin's fingerprinting turns out to be still quite expensive taking three times more than SHA-1. However, the aggregate SHA-1 cost increases as MRC's leaf chunk size decreases. If naively implemented, the total CPU cost of an MRC tree with a height n would be n×Rabin's fingerprinting time+sum of SHA-1 calculation of each level.

In some embodiments, two general optimizations can be applied to both the S-Waprox 230 and the R-Waprox 220. First, the Waproxs can run Rabin's fingerprinting on content only once, detect the smallest chunk boundaries, and derive the larger chunk boundaries from them. Second, the Waproxs compute SHA-1 hashes only when necessary using the chunk name hint. For example, if the S-Waprox 230 knows that this chunk has been sent to the R-Waprox 220 before, the S-Waprox 230 assumes all of its children are already in the R-Waprox 220 and sends only the name of the parent. Likewise, if the R-Waprox 220 knows that a chunk has been stored on disk before, it does not re-store its children.

In addition, the R-Waprox 220 may be implemented with a specific optimization. For example, in one embodiment, when the top-level chunk is a miss with the R-Waprox 220, but there are some chunk hits in the lower levels in the MRC tree, the R-Waprox 220 only needs to run fingerprinting with the cache-missed candidate list chunks. In order to support this, the R-Waprox 220 now stores a Rabin's fingerprint value (8 bytes) along with each chunk name hint. If a chunk in the candidate list is a cache hit, the R-Waprox 220 can retrieve the fingerprint value for the chunk. If a chunk is a cache miss, the R-Waprox 220 runs the fingerprinting function to find and store any smaller chunks. The R-Waprox 220 now knows Rabin's fingerprint values for all chunks in the candidate list, so the R-Waprox 220 can also reconstruct any parents without running the fingerprinting on the cache-hit chunks.

Figure 12:
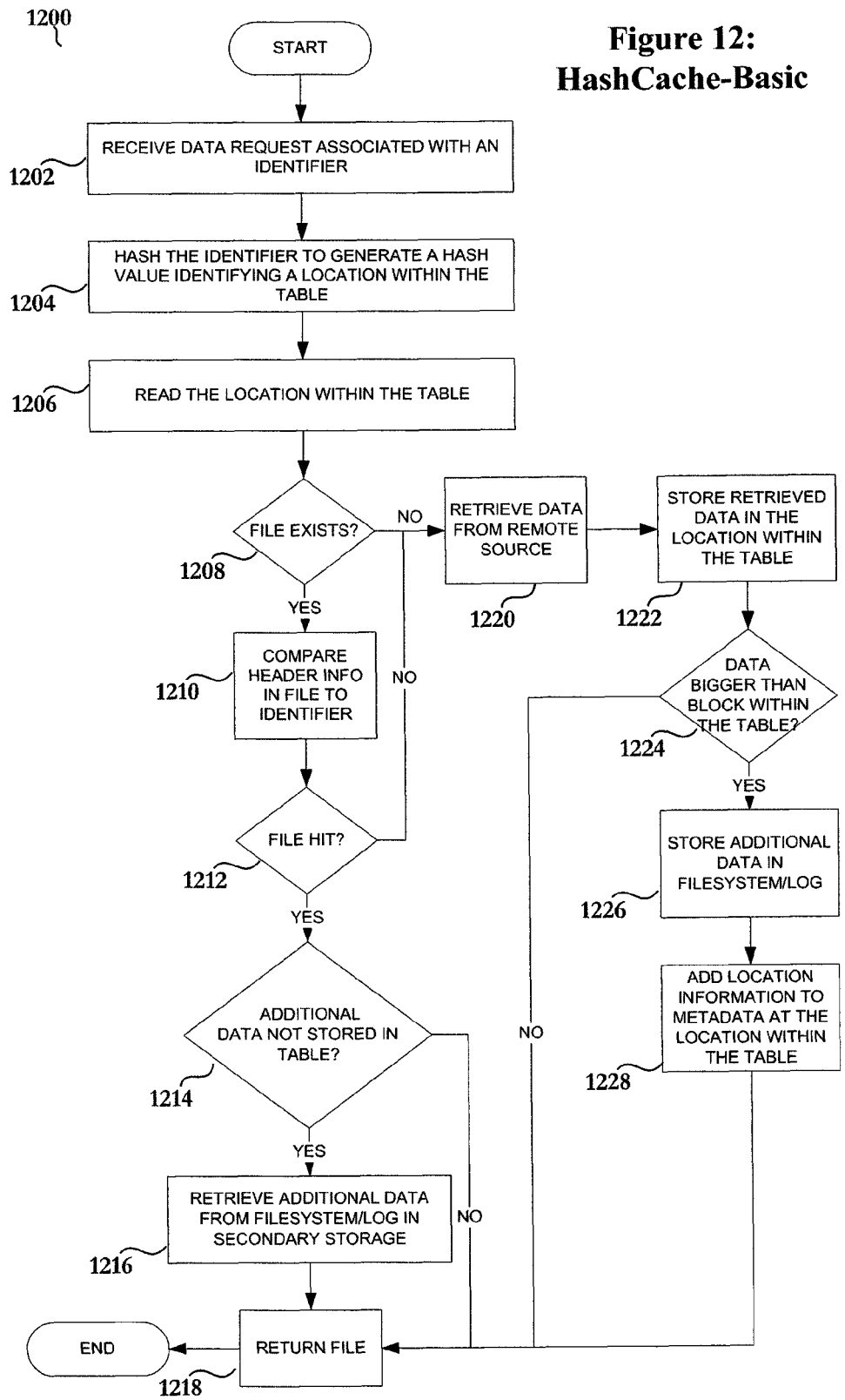
FIG. 12 is a flowchart illustrating a process for storing and retrieving data from an object cache according to an illustrative embodiment.

With reference now to FIGS. 12 and 13, a flowchart and schematic diagram is presented that illustrate a process 1200, herein referred to as HashCache, for storing and retrieving data from a cache according to an illustrative embodiment. HashCache is a configurable cache storage engine designed to meet the needs of cache storage where memory is not affordable such as in developing countries. HashCache presents a radical departure from the conventional wisdom in network cache design, and uses 6 to 20 times less memory than current techniques while still providing comparable or better performance. Some embodiments of HashCache, e.g., HashCache-Basic (illustrated in FIGS. 12 and 13) and Hash-Cache-Set (illustrated in FIGS. 13 and 14), as will be further described, uses no main memory for indexing and obtains performance comparable to traditional software solutions such as the Squid Web proxy cache. The highest performance policy, HashCache-Log (illustrated in FIGS. 18 and 19), performs equally with commercial cache appliances while using main-memory indexes that are only one-tenth their size. Between these policies are a range of distinct policies, e.g., HashCache-SetMem (illustrated in FIGS. 16 and 17) that trade memory consumption for performance suitable for a range of workloads in developing regions.

In addition to good performance with low resource consumption, HashCache provides a number of additional benefits suitable for developing-world usage: (a) many HashCache policies can be tailored to use main memory in proportion to system activity, instead of cache size; (b) unlike commercial caching appliances, HashCache does not need to be the sole application running on the machine; (c) by simply choosing the appropriate indexing scheme, the same cache software can be configured as a low-resource end-user cache appropriate for small classrooms, as well as a high-performance backbone cache for higher levels of the network; (d) in its lowest-memory configurations, HashCache can run on laptop-class hardware attached to an external multi-terabyte storage (e.g., via USB), a scenario not even possible with existing designs; and (e) HashCache provides a flexible caching layer, allowing it to be used not only for Web proxies, but also for other cache-oriented storage systems. For example, a web proxy having a 1 terabyte (TB) sized HashCache can provide a large HTTP store that allows caching of a wide range of traffic. In addition, the web proxy can speculatively preload content during off-peak hours. Furthermore, this kind of system can be driven from a low-class laptop, with only 256 MB of total RAM. One such laptop can act as a cache server for the rest of the laptops in the deployment, thus, eliminating the need for separate server class hardware. In comparison to other Web caches, with a single 1 TB drive, the in-memory index alone would be over 10 GB as in the case of Squid. As such, HashCache can be deployed in configurations not attainable with current approaches, such as having multiple terabytes of external storage cache attached to low-powered machines.

With reference to FIG. 12, the process 1200 implements HashCache-Basic, the simplest design option in the HashCache family, removing the in-memory index entirely. Process 1200 may be implemented by a generic WAN accelerator, web proxy, and/or a Waprox device as disclosed above for maintaining an object cache. In addition, the process 1200 may be utilized by other applications/devices for caching any type of data. The process 1200 is executed in an environment in which the secondary storage is arranged to include a table of contiguous blocks 1302 (i.e., a fixed-size, non-chained, hash table with one object stored in each bin) and either a regular filesystem or a log-structured filesystem 1303 (as illustrated in the embodiment depicted in FIG. 13). A log-structured file system treats its storage as a circular log and writes sequentially to the head of the log. This maximizes write throughput on magnetic media by avoiding costly disk seeks.

Process 1200 begins, at step 1202, by receiving a data request associated with an identifier, e.g., a URL 1304 of a website. The process hashes the identifier to generate a hash value 1306 at step 1204. All or a portion of the generated hash value 1306 identifies a block location 1308 in the table of contiguous blocks 1302. At step 1206, the process reads the data, if any, stored in the block location 1308 in the table of contiguous blocks 1302. The process determines if a file exists within the block location 1308 at step 1208. The term "file" as used herein and in the diagrams refers to either a complete file, a partial file, an object, a URL, or a cached entity. If a file exists as the block location 1308 (e.g., file 1310), the process, at step 1210, compares an identifier (e.g., a URL, object name, or a portion thereof) stored in the header of the stored file to determine if it is match (i.e., a file hit) with the identifier associated with the data request at step 1212. If it is a file hit, the process, at step 1214, determines at step 1214 whether the file contains additional data (e.g., 1312) not stored in the determined block location in the table of contiguous blocks 1302. The location of any additional portions may be identified by the metadata of the file/object stored in the determined block location in the table. If the object's metadata indicates that there are additional portions, the process retrieves the additional portions/data from the regular filesystem or log filesystem 1303 in secondary storage at step 1216. The process returns the retrieved file/object at step 1218.

However, if the process, at step 1208, determines that a file does not exist within the block location 1308 or, at step 1212, that the identifier of the requested data does not match an identifier stored at the block location 1308, the process requests the requested data/object from a remote source (e.g., content providing device 240) at step 1220. At step 1222, the process stores or overwrites the retrieved data in the block location 1308 in table 1302. If, at step 1224, the process determines that the retrieved data is bigger than the block/bin size of the block location 1308, the process, at step 1226, stores the additional data in the regular filesystem or writes the additional data to the beginning of the log filesystem 1303. At step 1228, the process adds location information of the additional portions stored in the regular filesystem or log filesystem to the metadata/header of the object stored at the block location 1308. The process returns the retrieved file/object at step 1218.

The performance impact of HashCache-Basic in comparison to high-performance caches is that HashCache-Basic will have an increase in hash collisions (reducing cache hit rates) and will require a disk access on every request, even cache misses. In addition, storing objects will require one seek per object (due to the hash randomizing the location) and possibly an additional write to the circular log.

HashCache-Set, another embodiment of the HashCache family, reduces hash collisions by expanding the disk table to become an N-way set-associative hash table, where each bin can store N elements (as illustrated in FIG. 15, disk table 1502). In HashCache-Set, objects/URLs that map on to a set can be placed anywhere in the set. Because the locations are contiguous on disk, and because short reads have much lower latency than seeks, reading all of the members of the set takes only marginally more time than reading just one element. Each element still contains metadata with the full object name, size, and location in the circular log 1503 and/or regular filesystem of any remaining part of the object.

With reference to FIG. 14, a process 1400 illustrates the implementation of HashCache-Set. Process 1400 begins, at step 1402, by receiving a data request associated with an identifier/object name, e.g., a URL 1504 of a website. The process hashes the identifier to generate a hash value 1506 at step 1404. All or a portion of the generated hash value 1506 identifies a set 1508 in the disk table 1502. At step 1406, the process reads the metadata of each element/block within the set 1508 until the process determines a matching identifier at step 1408. If the process finds a match within a block of the set, the process retrieves the file 1510 from the identified block at step 1410. The process, at step 1412, determines from the header or metadata of the file 1510 whether the file 1510 contains additional data (e.g., 1512) not stored in the determined block location within the set 1508 of the disk table 1502. If the file's metadata indicates that there are additional portions not stored with the set 1508, the process retrieves the additional portions/data from the regular filesystem or log filesystem 1503 in secondary storage at step 1414. At step 1416, the process updates the least recently used (LRU) data for the file. The LRU data is used to determine which file/block within a set is overwritten when no empty blocks are available for a new entry within a set. Although the above process replaces the least recently used (LRU), other cache replacement strategies, such as, but not limited to, least frequently used (LFU) may be implemented in any of the HashCache implementations described herein. The process returns the retrieved file/object at step 1418.

If the process, at step 1408, does not find a matching identifier within any of the blocks within the set, the process requests the requested data/object from a remote source at step 1420. At step 1422, the process determines if there is an empty block within the set 1508 of the disk table 1502 for storing the retrieved data. If the set has an empty block, the process stores the retrieved data in the empty block location (e.g., block 1516) within the set 1508 at step 1424. If the process determines that the set 1508 does not contain any empty blocks, the process, at step 1426, overwrites the data of a block having data that is least recently used (LRU) in comparison to the other blocks within the set with the newly retrieved data. If the process determines, at step 1428, that the retrieved data is bigger than the block size of a block within the set, the process, at step 1430, stores the additional data in the regular filesystem (not depicted) or writes the additional data to the beginning of the log filesystem 1503. At step 1432, the process adds location information of the additional portions stored in the regular filesystem or the log filesystem 1503 to the metadata/header of the object stored at the block location within the set. If the process has not done so, the process, at step 1416, updates the least recently used (LRU) data for the files/objects stored in the blocks of the set 1508. The process returns the retrieved file/object at step 1418.

The above process 1400 (HashCache-Set) reduces the impact of popular objects mapping to the same hash bin, without using an in-memory index, while only slightly increasing the time to access an object. While HashCache-Set eliminates problems stemming from collisions in the hash bins, it still has several problems. First, HashCache-Set requires disk access for cache misses. Second, HashCache-Set lacks an efficient mechanism for cache replacement within the set. Implementing something like LRU within the set using the on-disk mechanism would require a potential disk write on every cache hit, thus, reducing performance. Requiring a disk seek to determine a cache miss is a major issue for workloads with low cache hit rates, since an indexless cache would spend most of its disk time confirming cache misses. This behavior would add extra latency for the end-user, and provide no benefit.

Figure 16:
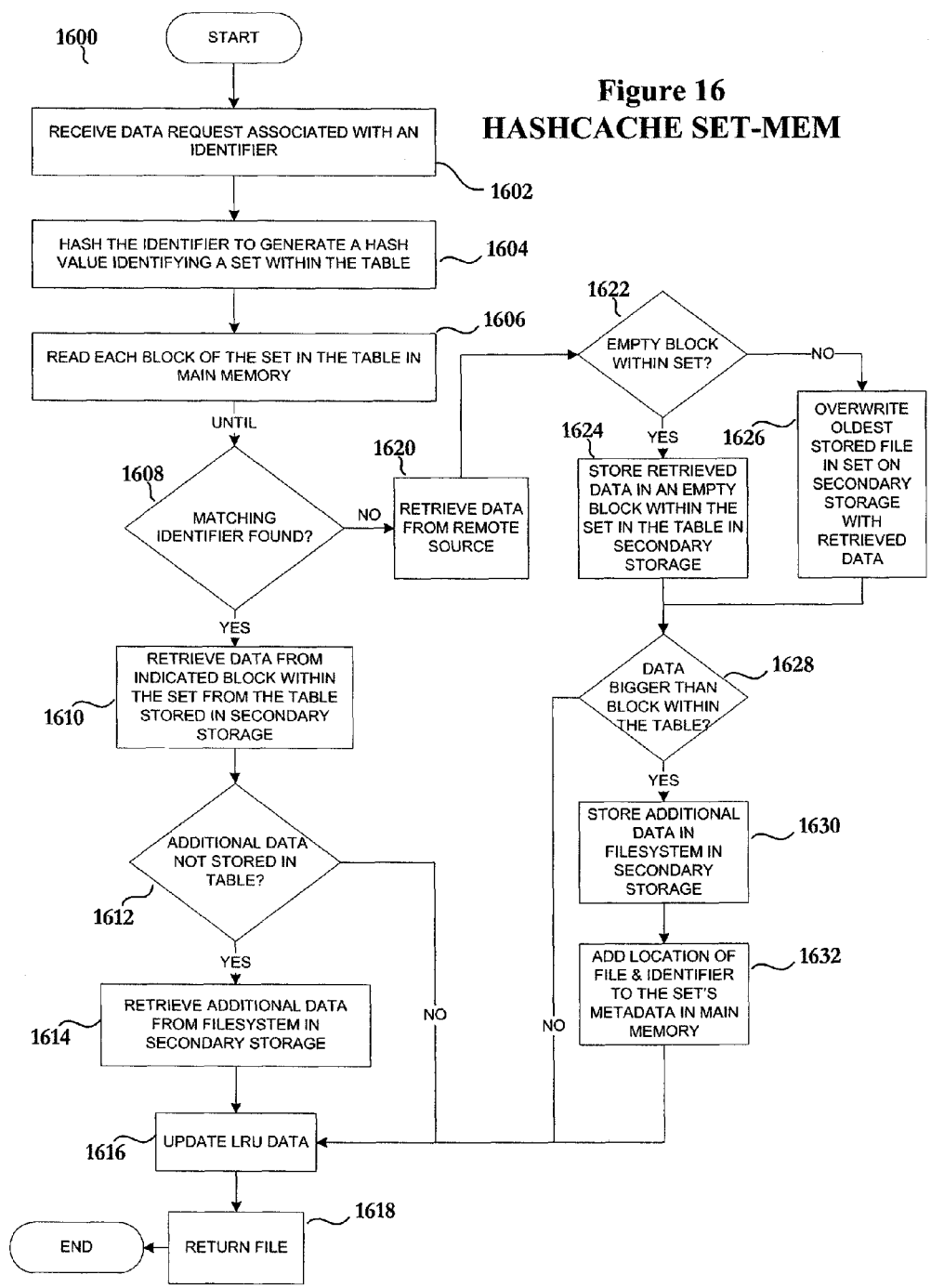
FIG. 16 is a flowchart illustrating still another process for storing and retrieving data from an object cache according to an illustrative embodiment.

To address the problem of requiring seeks for cache misses, FIGS. 16 and 17 present another embodiment of the disclosed HashCache family, HashCache-SetMem, which implements an in-memory index, but employs several optimizations to keep the index much smaller than traditional approaches. For example, one optimization technique employed by Hash-Cache-SetMem is to store in main memory an H-bit hash value for each cached object (e.g., the 8 most significant hash bits per object). These hash values can be stored in a two-dimensional array 1702 which corresponds to a disk table 1704, with one row for each bin, and N columns corresponding to the N-way associativity. An LRU cache replacement policy would need forward and reverse pointers per object to maintain the LRU list, bringing the per-object memory cost to (H+64) bits assuming 32-bit pointers. However, HashCache-SetMem reduces this storage as follows. First, we note that all the entries in an N-entry set share the same modulo hash value (% S) where S is the number of sets in the disk table 1704. HashCache-SetMem drops the lowest log(S) bits from each hash value with no loss, reducing the hash storage to only H-log(S) bits per object. Second, HashCache-SetMem implements LRU by simply ranking the entries from 0 to N-1 because cache replacement policies only need to be implemented within the N-entry set, thereby, using only log(N) bits per entry. Third, in some embodiments, HashCache-SetMem may keep in-memory indexes for only some sets, not all sets, thus, restricting the number of in-memory entries based on request rate, rather than cache size. This approach, hereinafter referred to as HashCache-SetMemLRU, keeps sets in an LRU fashion and fetches the in-memory index for a set from disk on demand. By keeping only partial sets, HashCache-SetMemLRU needs to keep a bin number with each set, LRU pointers per set, and a hash table to find a given set in memory.

Deciding when to use HashCache-SetMem versus HashCache-SetMemLRU depends on the size of the hash value and the set associativity. For example, assuming 8-way associativity and the 8 most significant hash bits per object, the break-even point is around 50%—once more than half the sets will be stored in memory, it is cheaper to remove the LRU pointers and bin number, and just keep all of the sets (i.e., use HashCache-SetMem instead of HashCache-SetMemLRU). With a low hash collision rate, HashCache-SetMem can determine most cache misses without accessing disk, whereas HashCache-SetMemLRU, with its tunable memory consumption, will need disk accesses for some fraction of the misses. However, once a set is in memory, performing intra-set cache replacement decisions requires no disk access for policy maintenance. Writing objects to disk will still require disk access.

With reference now to FIGS. 16 and 17, a process 1600 illustrates the implementation of HashCache-SetMem. Process 1600 begins, at step 1602, by receiving a data request associated with an identifier/object name, e.g., a URL 1706 of a website. The process hashes the identifier to generate a hash value 1708 at step 1604. All or a portion of the generated hash value 1708 identifies a set 1710 in the two-dimensional array 1702 stored in main memory corresponding to the disk table 1704 stored in secondary storage. At step 1606, the process reads the metadata of each element within the set 1710 of the two-dimensional array 1702 until the process either finds a matching identifier at step 1608 or until all elements within the set 1710 has been checked. If the process finds a match within a block of the set 1710, the process, at step 1610, retrieves the file 1712 from the corresponding set 1714 of the disk table 1704 in secondary storage. The process, at step 1612, determines from the header or metadata of the file 1712 whether the file contains additional data 1716 not stored in the disk table 1704. If the file's metadata indicates that there are additional portions not stored with the disk table 1704, the process, at step 1614, retrieves the additional portions/data from the regular filesystem or log filesystem 1718 in secondary storage. At step 1616, the process updates the least recently used (LRU) data for the file/set. The process returns the retrieved file/object at step 1618, with process 1600 terminating thereafter.

If the process, at step 1608, does not find a matching identifier within any of the blocks within the set, the process requests the requested data/object from a remote source at step 1620. At step 1622, the process determines if there is an empty block within the set 1714 of the disk table 1704 for storing the retrieved data. If the set has an empty block, the process stores the retrieved data in the empty block location (e.g., block 1720) within the set 1714 at step 1624. If the process determines that the set 1714 does not contain any empty blocks, the process, at step 1626, overwrites the data of a block having data that is least recently used (LRU) in comparison to the other blocks within the set 1714 with the newly retrieved data. If the process determines, at step 1628, that the retrieved data is bigger than the block size of a block within the set 1714, the process, at step 1630, stores the additional data in the regular filesystem (not depicted) or writes the additional data to the beginning of the log filesystem 1718. At step 1632, the process adds location information and other identifying information of the file to the metadata stored within the set 1710 in main memory. If the process has not done so, the process, at step 1616, updates the least recently used (LRU) data for the files/objects stored in the blocks of the set 1714. The process returns the retrieved file/object at step 1618.

Using HashCache-SetMem, cache hits require one seek for small files, and cache misses require no seeks (excluding false positives from hash collisions) if the associated set's metadata is in memory. Cache writes still require seeks because object locations are dictated by their hash values, leaving HashCache-SetMem at a performance disadvantage to high-performance caches that can write all content to a circular log. This performance problem is not an issue for caches with low request rates, but will become a problem for higher request rate workloads.

To address this problem, we introduce a new policy, Hash-Cache-Log, illustrated in FIGS. 18 and 19, which eliminates the disk table (e.g., disk table 1704) and treats the disk as a log 1902, similar to the high-performance caches. For some or all objects, HashCache-Log stores an additional offset (32 or 64 bits) specifying the location on disk. HashCache-Log retains the in memory index 1904 with N-way set associativity and per-set LRU replacement because they eliminate disk seeks for cache misses with compact implementation. While this approach significantly increases memory consumption, it can also yield a large performance advantage, so this tradeoff is useful in many situations. However, even when adding the log location, the in-memory index 1904 is still much smaller than traditional caches. For example, for 8-way set associativity, per-set LRU requires 3 bits per entry, and 8 bits per entry can minimize hash collisions within the set. Adding a 32-bit log position increases the per-entry size from 11 bits to 43 bits, but virtually eliminates the impact of write traffic, since all writes can now be accumulated and written in one disk seek. Additionally, HashCache-Log needs a few bits (assume 4) to record the log generation number, driving the total to 47 bits.

Even at 47 bits per entry, HashCache-Log still uses indexes that are a factor of 6-12 times smaller than current high-performance proxies.

HashCache-Log can reduce this overhead even further if HashCache-Log exploits Web object popularity, where half of the objects are rarely, if ever, re-referenced. In this case, HashCache-Log can drop half of the log positions from the in-memory index, and just store them on disk, reducing the average entry size to only 31 bits, for a small loss in performance, hereinafter referred to as HashCache-LogLRU.

HashCache-LogLRU allows the number of log position entries per set to be configured, typically using N/2 log positions per N-object set. The remaining log offsets in the set are stored on the disk as a small contiguous file. Keeping this file and the in-memory index 1904 in sync requires a few writes reducing the performance by a small amount. The in-memory index size 1904, in this case, is 9-20 times smaller than traditional high-performance systems.

FIGS. 18 and 19 illustrate and schematically depict a process 1800 that implements HashCache-Log. Process 1800 begins, at step 1802, by receiving a data request associated with an identifier/object name, e.g., a URL 1906 of a website. The process hashes the identifier to generate a hash value 1908 at step 1804. All or a portion of the generated hash value 1908 identifies a set 1910 in the in-memory index 1904. At step 1806, the process reads the metadata of each element within the set 1910 of the in-memory index 1904 until the process either finds a matching identifier at step 1808 or until all elements within the set 1910 has been checked. If the process finds a match within a block of the set 1910, the process, at step 1810, determines the location of the requested data (i.e., identifies the offset for retrieving the data from the log 1902 in secondary storage). At step 1812, the process retrieves the requested data (e.g., data 1912) from the determined location on the log 1902. The process, at step 1814, updates the least recently used (LRU) data for the file/set 1910 in the in-memory index 1904. The process returns the retrieved file/object at step 1816.

If the process, at step 1808, does not find a matching identifier within any of the blocks within the set 1910 in the in-memory index 1904, the process requests the requested data/object from a remote source at step 1820. At step 1822, the process writes the retrieved data to the head of the log 1902 in contiguous blocks. The process adds location information and other identifying information of the file to the metadata stored within the set 1910 of the in-memory index 1904. If the process has not done so, the process, at step 1814, updates the least recently used (LRU) data for the file/set 1910 in the in-memory index 1904. The process returns the retrieved file/object at step 1816.

Using the HashCache optimizations described above, caching storage can require as little as 1 seek per object read for small objects, with no penalty for cache misses, and virtually no cost for cache writes that are batched together and written to the end of the circular log. However, even this performance can be further improved, by noting that prefetching multiple objects per read can amortize the read cost per object. For example, correlated access can arise in situations like Web pages, where multiple small objects may be embedded in the HTML of a page, resulting in many objects being accessed together during a small time period. Grouping these objects together on disk would reduce disk seeks for reading and writing. The remaining blocks for these pages can all be coalesced together in the log and written together so that reading them can be faster, ideally with one seek.

The only change necessary to support this policy is to keep a content length (in blocks) for all of the related content written at the same time, so that it can be read together in one seek. When multiple related objects are read together, the system will perform reads at less than one seek per read on average. This approach can be applied to many of the previously described Hash-Cache policies, and only requires that the application using HashCache provide some information about which objects are related. Assuming prefetch lengths of no more than 256 blocks, this policy only requires 8 bits per index entry being read. In the case of HashCache-LogLRU, only the entries with in-memory log position information need the additional length information. Otherwise, this length can also be stored on disk. As a result, adding this prefetching to HashCache-LogLRU only increases the in-memory index size to 35 bits per object, assuming half the entries of each set contain a log position and prefetch length.

FIG. 20 illustrates a table comparing the various versions of HashCache as disclosed above. As can be seen in FIG. 20, many of the HashCache policies use can cache a TB size disk using 256 MB or less. Even the more memory consuming HashCache policies use less than a GB of memory for a TB size disk while providing equally or better performance than any of the currently available commercial products. In comparison, the available commercial products requires anywhere from 4 GB to 13 GB of memory for a TB disk cache. Accordingly, HashCache can be deployed in configurations not attainable with current approaches such as on low-powered machines typically found in third world countries.

FIG. 21 is a table depicting the throughput implications of the different HashCache policies in comparison to a commercially available web proxy cache product. The maximum request rate (rr) is a function of the disk seek rate, the hit rate, the miss rate, and the write rate. The write rate is required because not all objects that are fetched due to cache misses are cacheable. FIG. 21 presents throughputs for each system as a function of these parameters. The cache hit rate (chr) is simply a number between 0 and 1, as is the cacheability rate (cbr). Since the miss rate is (1−chr), the write rate can be represented as (1−chr)·cbr. The peak disk seek rate (t) is a measured quantity that is hardware-dependent, and the average number of related objects (rel) is always a positive number. These throughputs are conservative estimates that do not take into account the in-memory hot object cache, where some portion of the main memory is used as a cache for frequently used objects, which can further improve throughput. Using the depicted throughput estimates HashCache-LogLRU and HashCache-Log (both with read prefetching) provide comparably the same throughput as the best available commercial product. For example, with a SATA type 7200 RPM hard drive, the HashCache-LogLRU, HashCache-Log, and the commercial product have estimated throughputs of 264 (reqs/sec). The throughput increases the same for all three to 340 (reqs/sec) for a SCSI type drive spinning at 10,000 RPMs and to 560 (reqs/sec) for a SCSI type drive spinning at 15,000 RPMs. Accordingly, HashCache can provide comparable throughput to any current design while using significantly less memory.

Referring now to FIG. 22, a chart is presented illustrating the resource usage for the various HashCache policies in comparison to Squid (an open source web proxy cache product) and Tiger (a commercial web proxy cache product) for a single-disk experiment. In all cases, the disk is the ultimate performance bottleneck, with nearly 100% utilization. The user and system CPU remain relatively low, with the higher system CPU levels tied to configurations with higher request rates. The most surprising metric, however, is Squid's high memory usage rate. Given that its storage size was only one-third that used by HashCache, it still exceeds HashCache's memory usage in HashCache's highest performance configuration. In comparison, the lowest performance HashCache configurations, which have performance comparable to Squid, barely register in terms of memory usage.

It should be apparent from the foregoing that an invention having significant advantages has been provided. The above disclosure describes certain embodiments of the claimed invention and is not intended to limit the scope of the claimed invention. In addition, the disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions, hardware components, and/or any combination thereof. In addition, the flowchart and block diagrams in the figures illustrate the architecture, functionality, and operation of possible implementations of systems, methods, and computer program products according to various embodiments of the claimed invention. In this regard, each block in the flowchart or block diagrams may represent a module, segment, or portion of code, which may include one or more executable instructions for implementing the specified logical function(s). In some alternative implementations, the functions noted in the block may occur out of the order noted in the figures and/or may be omitted. In addition, two blocks shown in succession may, in fact, be executed substantially concurrently, or the blocks may sometimes be executed in the reverse order, depending upon the functionality involved.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. In addition, as referenced herein, a module is defined as hardware, software, and/or a combination thereof for performing a particular function. Software is defined as computer executable instructions including, but not limited to, object code, assembly code, and machine code. Hardware may include, but is not limited to, one or more processors/microprocessors, electronic circuitry, and other physical components. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

We claim:

1. A method for accelerating data retrieval over a data network using a processor of a first proxy device and a local data storage unit, the method comprising:
   receiving, by the first proxy device, a request for data sent from an end user device to a source data device;
   establishing, by the first proxy device, a connection with a second proxy device, the second proxy device in communication with the source data device;
   transmitting, by the first proxy device, the request for the data to the second proxy device, the second proxy device forwarding the request to the source data device and receiving the data from the source data device;
   receiving, by the first proxy device, a plurality of chunk names corresponding to a plurality of data chunks generated by the second proxy device from the received data;
   determining, using the processor of the first proxy device, whether the local data storage unit contains one or more of the plurality of data chunks using the plurality of chunk names;
   determining an optimized retrieval schedule for retrieving the plurality of data chunks associated with the plurality of chunk names in response to a determination that the local data storage unit does not contain one or more of the plurality of data chunks associated with the plurality of chunk names;
   providing the data to the end user device in response to retrieving the plurality of data chunks associated with the plurality of chunk names based on the optimized retrieval schedule and;
   wherein the plurality of data chunks is generated by the second proxy device to produce a hierarchy of co-existing different size data chunks.

2. The method of claim 1, further comprising:
   requesting at least one of a non-locally stored data chunks associated with the plurality of data chunks from the second proxy device in response to a determination that the local data storage unit does not contain all the plurality of data chunks associated with the plurality of chunk names; and
   storing the at least one of the non-locally stored data chunks in the local data storage unit in response to receiving the at least one of the non-locally stored data chunks from the second proxy device.

3. The method of claim 1, further comprising:
   requesting at least one of a non-locally stored data chunks associated with the plurality of data chunks from a local peer device in response to a determination that the local data storage unit does not contain all the plurality of data chunks associated with the plurality of chunk names; and
   storing the at least one of the non-locally stored data chunks in the local data storage unit in response to receiving the at least one of the non-locally stored data chunks from the local peer device.

4. The method of claim 1, further comprising:
   in response to a determination that the local data storage unit does not contain all the plurality of data chunks associated with the plurality of chunk names, transmitting a first request for at least one of a non-locally stored data chunks associated with the plurality of data chunks to the second proxy device and transmitting a second request for at least another one of the non-locally stored data chunks associated with the plurality of data chunks to a local peer device, wherein the first request and the second request are performed in parallel.

5. The method of claim 1, further comprising:
   transmitting, by the first proxy device, a chunk acknowledgement message to the second proxy device indicating the successful transmission of the data to the end user device.

6. The method of claim 1, further comprising:
   transmitting, by the first proxy device, a close connection message to the second proxy device to inform the second proxy device to close its connection with the source data device in response to closing a connection between the end user device and the first proxy device.

7. The method of claim 1, wherein a first connection between the end user device and the first proxy device is a low bandwidth connection, and a second connection between the second proxy device and the source data device is a high bandwidth connection in comparison to the low bandwidth connection.

8. The method of claim 1, wherein the local data storage unit includes multiple data storage units.

9. The method of claim 1, wherein the hierarchy of co-existing different size data chunks references the same underlying data.

10. The method of claim 9, wherein generating the hierarchy of coexisting different size data chunks comprises:
    determining an initial set of boundaries that are aligned by using a global constant K for boundary detection for all chunk sizes;
    varying a number of bits of K used for each level such that a higher level using a lowest (n+m) bits has boundaries that are a subset of a lower level that uses n bits;
    determining higher level boundaries by performing content fingerprinting using a smallest chunk size; and
    coalescing chunks smaller than a minimum size in response to determining the higher level boundaries.

11. The method of claim 1, wherein the plurality of chunk names received by the first proxy device corresponds to a partial list of the plurality of data chunks generated by the second proxy device.

12. The method of claim 11, further comprising the second proxy device generating the partial list of the plurality of data chunks by removing names of data chunks from the partial list of the plurality of data chunks that the second proxy device has previously encountered.

13. The method of claim 12, further comprising the second proxy device generating the partial list of the plurality of data chunks by keeping names of data chunks on the partial list of the plurality of data chunks that the second proxy device has not previously encountered.

14. The method of claim 1, further comprising:
    distributing, by the first proxy device, requests for at least one of a non-locally stored data chunks associated with the plurality of data chunks to a plurality of local peer devices in response to a determination that the local data storage unit does not contain all the plurality of data chunks associated with the plurality of chunk names; and storing the at least one of the non-locally stored data chunks in the local data storage unit in response to receiving the at least one of the non-locally stored data chunks from the plurality of local peer devices.

15. The method of claim 1, wherein determining the optimized retrieval schedule for retrieving the plurality of data chunks further comprises:

comparing a network fetch latency for requesting a locally stored data chunk from the second proxy device to a disk fetch latency for retrieving the locally stored data chunk from at least one of the local data storage unit and a local peer device;

requesting from the second proxy device a smallest locally stored data chunk in response to the network fetch latency being less than the disk fetch latency; and updating the network fetch latency and the disk fetch latency;

repeating the comparing, requesting, and updating steps until the network fetch latency and the disk fetch latency equalizes.

* * * * *